United States Patent
Young et al.

(10) Patent No.: US 10,959,039 B2
(45) Date of Patent: Mar. 23, 2021

(54) TECHNOLOGIES FOR AN AUTOMATED APPLICATION EXCHANGE IN WIRELESS NETWORKS

(71) Applicant: Intel Corporation, Santa Clara, CA (US)

(72) Inventors: Valerie J. Young, Portland, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/533,149

(22) Filed: Aug. 6, 2019

(65) Prior Publication Data

US 2020/0204942 A1    Jun. 25, 2020

Related U.S. Application Data

(63) Continuation of application No. 15/900,353, filed on Feb. 20, 2018, now Pat. No. 10,375,511, which is a continuation of application No. 15/224,016, filed on Jul. 29, 2016, now Pat. No. 9,900,725.

(60) Provisional application No. 62/198,471, filed on Jul. 29, 2015.

(51) Int. Cl.
| | |
|---|---|
| *H04W 4/02* | (2018.01) |
| *H04W 4/70* | (2018.01) |
| *H04W 4/60* | (2018.01) |
| *H04W 24/02* | (2009.01) |

(52) U.S. Cl.
CPC .............. *H04W 4/02* (2013.01); *H04W 4/60* (2018.02); *H04W 4/70* (2018.02); *H04W 24/02* (2013.01); *H05K 999/99* (2013.01)

(58) Field of Classification Search
CPC .................................. H04W 4/70; H04W 4/02
See application file for complete search history.

(56) References Cited

U.S. PATENT DOCUMENTS

| | | | |
|---|---|---|---|
| 2002/0026373 A1* | 2/2002 | Kamath | G06Q 30/0635 705/26.43 |
| 2007/0016676 A1* | 1/2007 | Breuer | G06F 16/252 709/225 |
| 2015/0055623 A1* | 2/2015 | Li | H04W 40/04 370/331 |
| 2016/0088021 A1* | 3/2016 | Jayanti Venkata | H04L 63/08 726/1 |

* cited by examiner

*Primary Examiner* — Hsinchun Liao
(74) *Attorney, Agent, or Firm* — Hanley, Flight & Zimmerman, LLC

(57) ABSTRACT

Technologies for performing an automated application exchange negotiation in an operator network include an endpoint device, a mobile edge computing device, a core computing device, an application provider computing device, and a network operator computing device. The mobile edge computing device is configured to receive a request to access an application and/or service stored at the mobile edge computing device and/or the application provider computing device. The mobile edge computing device is further configured to initiate the automated application exchange negotiation between the application provider computing device and the network operator computing device to determine one or more terms of the negotiation, including one or more terms of a service level agreement (SLA). Other embodiments are described herein.

24 Claims, 10 Drawing Sheets

TECHNOLOGIES FOR AN AUTOMATED APPLICATION EXCHANGE IN WIRELESS NETWORKS

CROSS-REFERENCE TO RELATED APPLICATION

This application is a continuation of U.S. patent application Ser. No. 15/900,353, entitled "TECHNOLOGIES FOR AN AUTOMATED APPLICATION EXCHANGE IN WIRELESS NETWORKS," which was filed on Feb. 20, 2018, issued on Aug. 6, 2019, as U.S. Pat. No. 10,375,511 and which is a continuation of U.S. patent application Ser. No. 15/224,016, entitled "TECHNOLOGIES FOR AN AUTOMATED APPLICATION EXCHANGE IN WIRELESS NETWORKS," which was filed on Jul. 29, 2016, issued on Feb. 20, 2018, as U.S. Pat. No. 9,900,725, and which claims priority under 35 U.S.C. § 119(e) to U.S. Provisional Patent Application Ser. No. 62/198,471, entitled "TECHNOLOGIES FOR APPLICATION EXCHANGE IN WIRELESS NETWORKS," which was filed on Jul. 29, 2015.

BACKGROUND

Network operators and service providers continually update their networks to accommodate new technologies. In particular, wireless telephone technology has evolved over the years to support such new technologies. For example, 2G, or second-generation wireless telephone technology was designed for voice communications and allowed for mobile data services, among other advancements. Newer technologies, such as 3G (i.e., third-generation mobile telecommunications technologies for supporting voice and data, among other advancements) and 4G (i.e., fourth-generation mobile telecommunications technologies for supporting broadband internet, among other advancements), were developed and deployed to support various features of mobile computing devices with telecommunications capabilities. In other words, mobile computing device capabilities have driven the wireless telephone technology advancements.

As the wireless telephone technologies have advanced, so too has the concept of the internet of things (IoT). Broadly defined, the IoT comprises a network of physical objects that have been embedded with electronic circuitry, software, sensing circuitry, and wireless communication circuitry to enable the physical objects to exchange data with a manufacturer, operator, and/or other similarly capable physical devices based on the IoT infrastructure. In other words, objects that under conventional circumstances would not be outfitted with telecommunication data exchange technologies (e.g., a thermostat, a dishwasher, a vehicle, etc.), may be equipped with such technologies to effect communication to/from the objects. As such, the number of physical devices capable mobile telecommunication is expected to grow exponentially. Such scale generally requires more compute devices, more applications, and network services closer to the edge. As a result, further advancements of the present wireless telephone technology are expected, such as 5G (i.e., fifth-generation mobile networks, or fifth-generation wireless systems), in order to efficiently manage latency, performance, and jitter that is expected to result from the increased number of mobile telecommunication equipped physical devices on the IoT infrastructure.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
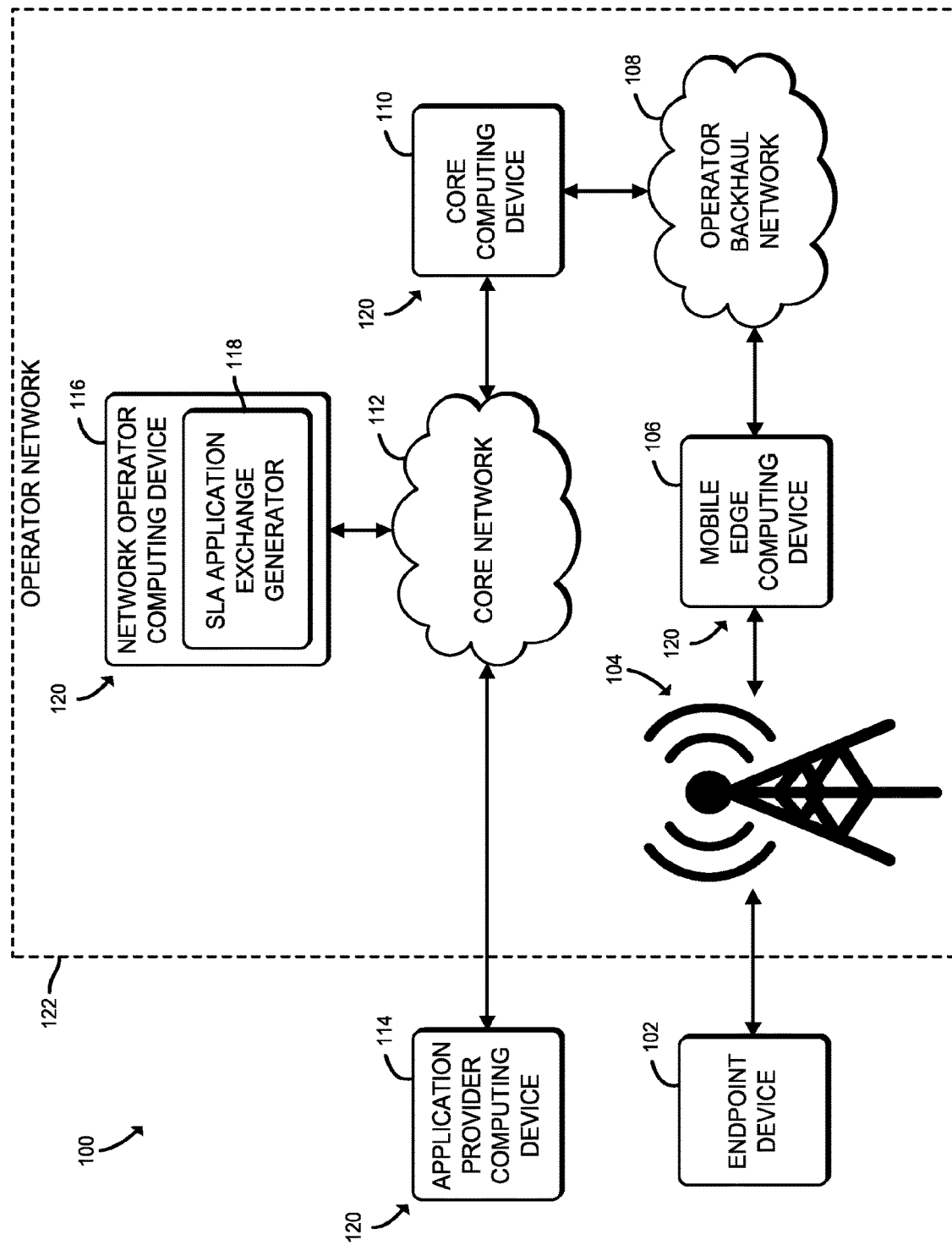
FIG. 1 is a simplified block diagram of at least one embodiment of a system for performing an automated application exchange in a wireless network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for performing an application exchange in an operator network 122 includes an endpoint device 102 in wireless telephonic communication with a series of computing devices 120. The illustrative computing devices 120 include a mobile edge computing device 106 communicatively coupled to the endpoint device 102 via a wireless telephone network access point 104 (e.g., a cellular tower, a Base Transceiver Station (BTS), etc.). The illustrative computing devices 120 additionally include a core computing device 110 communicatively coupled to the mobile edge computing device 106 via an operator backhaul network 108 (e.g., an operator backhaul network). Further, the illustrative computing devices 120 include an application provider computing device 114 and an network operator computing device 116 communicatively coupled to the core computing device 110 via an owner/host cloud network 112.

In use, as will be discussed in further detail, a user of the endpoint device 102 requests an application (e.g., an internet of things (IoT) application, an enterprise application, a cloud-based application, a mobile device application, etc.) to be accessed by the endpoint device 102. In some embodiments, the application for which access is being requested may be an application installed local to the endpoint device 102 that may rely on a network connection to receive data stored remote of the endpoint device 102 and usable to execute at least a portion of the application. Alternatively, in other embodiments, the requested application may be stored remote from the endpoint device 102, such as an application installed on the mobile edge computing device 106 or the application provider computing device 114 (i.e., the owner/provider of the application), and the endpoint device 102 is configured to interface with the application via a thin client (e.g., a web browser). While requesting an application is described herein, it should be appreciated that, in other embodiments, additional and/or alternative requests may be made, such as a request for a service (e.g., an internet of things (IoT) related service, an enterprise service, a cloud-based service, a network packet processing service, etc.).

To retrieve the application from a remote location and/or the data related thereto, the endpoint device 102 transmits a request to the mobile edge computing device 106 (i.e., over the operator network 122) using an identifier of the service/application being requested, such as a uniform resource locator (URL) corresponding to a storage location of the application and/or data, for example. If the requested application is not stored local to the mobile edge computing device 106, the mobile edge computing device 106 forwards the request over the operator backhaul network 108 to the core computing device 110, which interfaces with the application provider computing device 114 and the network operator computing device 116 via the owner/host cloud network 112. The core computing device 110 may then request the application from the application provider computing device 114.

In response to having received the request, the application provider computing device 114 may transmit a portion of the application to the endpoint device 102 in order to start user interaction with the application at the endpoint device 102 while negotiations are taking place between the application provider computing device 114 and the network operator computing device 116. To perform the negotiation, the application provider computing device 114, in an automated fashion, generates and transmits a quote based on user parameters supplied by the endpoint device 102 and/or the application provider computing device 114 to the network operator computing device 116. The quote may include any information related to the application exchange, such as a radio frequency, a radio quality, a mobility of the endpoint device 102, a resolution, a user SLA with the operator/application owner, a usage time, etc. The quote may additionally and/or alternatively include an amount of time allotted for negotiation of the service level agreement, a current negotiated price, etc.

In response to having received the quote, the network operator computing device 116 may either accept or reject the quote. If the network operator computing device 116 accepts the quote, the application provider computing device 114 may then transmit at least a portion of the application to the endpoint device 102 in a manner consistent with the accepted quote. Otherwise, if the network operator computing device 116 rejects the quote, the network operator computing device 116 may make any applicable changes to the quote and transmit the updated quote back to the application provider computing device 114. In some embodiments, the negotiation may be based on one or more parameters of the application being requested (i.e., application parameters) which define an attribute of the application and/or a characteristic of the network usage to transmit the application, such as a duration of time, a level or amount of bandwidth, an amount of currency, a video quality level, an audio quality level, etc. It should be appreciated that such application attributes and/or network characteristics may be monitored to ensure adherence to the negotiated SLA.

Upon having received the updated quote, the application provider computing device 114 may then either accept or reject the proposed changes to the quote. If the application provider computing device 114 accepts the changes (i.e., the terms of the SLA have been successfully negotiated), the application provider computing device 114 can send the application to the endpoint device 102; otherwise, the application provider computing device 114 may initiate a change to the updated quote and transmit the revised quote to the network operator computing device 116 in a cycle that may continue for a number of iterations. During the negotiation cycle, if a negotiation threshold is reached (i.e., the automated negotiation was unsuccessful), the network operator computing device 116 may inform the endpoint device 102 of the cost and provide an option to purchase.

Figure 2:
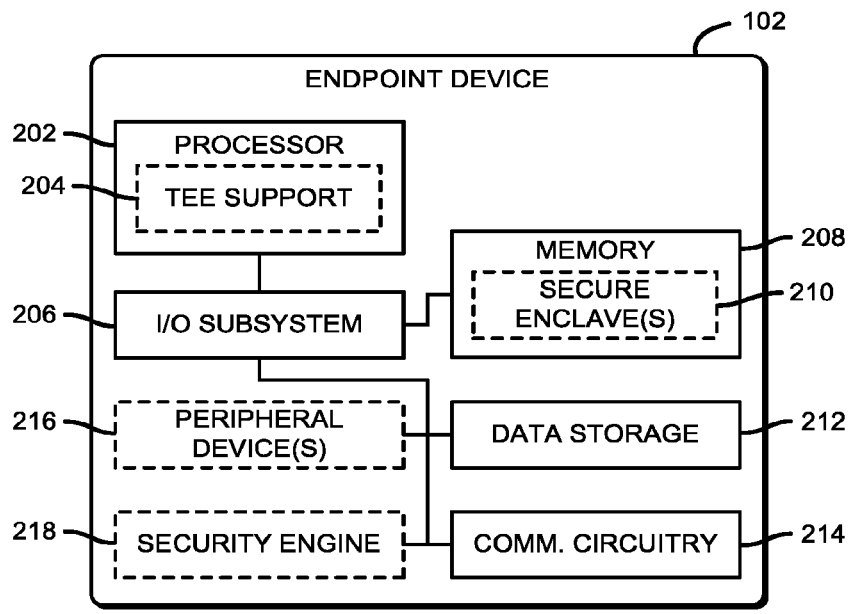
FIG. 2 is a simplified block diagram of at least one embodiment of an endpoint device of the system of FIG. 1.

The endpoint device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a network appliance (e.g., physical or virtual), a web appliance, a distributed computing system, a processor-based system, and/or a multiprocessor system. As shown in FIG. 2, the illustrative endpoint device includes a processor 202, an input/output (I/O) subsystem 206, a memory 208, a data storage 212, communication circuitry 214, and one or more peripheral devices 216. Of course, in other embodiments, the endpoint device 102 may include alternative or additional components, such as those commonly found in a computing device capable of communicating with a telecommunications infrastructure (e.g., various input/output devices). Additionally, in some embodiments, one or more of the illustrative components may be incorporated in, or otherwise form a portion of, another component. For example, the memory 208, or portions thereof, may be incorporated into one or more processors 202, in some embodiments.

The processor 202 may be embodied as any type of processor capable of performing the functions described herein. The processor 202 may be embodied as a single or multi-core processor(s), digital signal processor, microcontroller, or other processor or processing/controlling circuit. The processor 202 may include trusted execution environment (TEE) support 204. The TEE support 204 allows the processor 202 to establish a software execution environment in which executing code may be measured, verified, or otherwise determined to be authentic. Additionally, code and data included in the software TEE may be encrypted or otherwise protected from being accessed by code executing outside of the software TEE. In some embodiments, the TEE support 204 may be embodied as Intel® Software Guard Extensions (SGX) technology. Intel® SGX technology may be embodied as a set of processor instruction extensions that allow the processor 202 to establish one or more secure enclaves 210 in the memory 208, which may be embodied as regions of memory including software that is isolated from other software executed by the processor 202.

The memory 208 may be embodied as any type of volatile or non-volatile memory or data storage capable of performing the functions described herein. In operation, the memory 208 may store various data and software used during operation of the endpoint device 102, such as operating systems, applications, programs, libraries, and drivers. The memory 208 is communicatively coupled to the processor 202 via the I/O subsystem 206, which may be embodied as circuitry and/or components to facilitate input/output operations with the processor 202, the memory 208, and other components of the endpoint device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processors 202, the memory 208, and other components of the endpoint device 102, on a single integrated circuit chip.

The memory 208 may include one or more secure enclaves 210 (i.e., software isolation trusted execution environments (TEEs)). Each secure enclave 201 may be embodied as a protected region of the memory 208. Each secure enclave 210 may include code and data that is measured, validated, or otherwise authenticated. Additionally, the contents of the secure enclave 201 may be protected from access by software executing outside of the same secure enclave 210. The contents of each secure enclave 210 may be protected from access and/or tampering using any combination of hardware protection and/or cryptographic protection. For example, each secure enclave 210 may be embodied as a secure enclave created and otherwise managed using Intel® SGX technology. In some embodiments, a part or the entire secure enclave 210 may be stored in a specialized memory structure such as an enclave page cache (EPC).

The data storage 212 may be embodied as any type of device or devices configured for short-term or long-term storage of data such as, for example, memory devices and circuits, memory cards, hard disk drives, solid-state drives, or other data storage devices. The data storage 212 and/or the memory 208 may store various other data useful during the operation of the endpoint device 102. The communication circuitry 214 of the endpoint device 102 may be embodied as any communication circuit, device, or collection thereof, capable of enabling communications over the wireless telephone network access point 104. The communication circuitry 214 may be configured to use any one or more communication technology (e.g., wired or wireless communications) and associated protocols (e.g., Ethernet, Bluetooth®, Wi-Fi®, WiMAX, GSM, LTE, etc.) to effect such communication. The peripheral devices 216 may include any number of input/output devices, interface devices, and/or other peripheral devices. For example, in some embodiments, the peripheral devices 216 may include a display, touch screen, graphics circuitry, keyboard, mouse, speaker system, and/or other input/output devices, interface devices, and/or peripheral devices.

In some embodiments, the endpoint device 102 may also include a security engine 218. The security engine 218 may be embodied as any hardware component(s) or circuitry capable of establishing a trusted execution environment (TEE) on the endpoint device 102. In particular, the security engine 218 may support executing code and/or accessing data that is independent and secure from other code executed by the endpoint device 102. The security engine 218 may be embodied as a manageability engine (ME), an innovation engine (IE), an out-of-band (OOB) processor, or other security engine device or collection of devices. In some embodiments the security engine 218 may be embodied as a converged security and manageability engine (CSME) incorporated in a system-on-a-chip (SoC) of the endpoint device 102. Further, in some embodiments, the security engine 218 is also capable of communicating using the communication circuitry 214 or a dedicated communication circuit independently of the state of the endpoint device 102 (e.g., independently of the state of the processor 202), also known as "out-of-band" communication.

The wireless telephone network access point 104 may be embodied as any type of device, or devices, capable of enabling telephonic communication between an endpoint device 102 and a mobile edge computing device 106. In some embodiments, the wireless telephone network access point 104 may be a cellular tower, a BTS, etc.

Each of the mobile edge computing device 106, the core computing device 110, the application provider computing device 114, and the network operator computing device 116 may be embodied as any type of computation or computer device capable of performing the functions described herein, including, without limitation, a server (e.g., stand-alone, rack-mounted, blade, etc.), a network appliance (e.g., physical or virtual), a web appliance, a distributed computing system, a processor-based system, a multiprocessor system, a smartphone, a mobile computing device, a tablet computer, a laptop computer, a notebook computer, and/or a computer.

Figure 3:
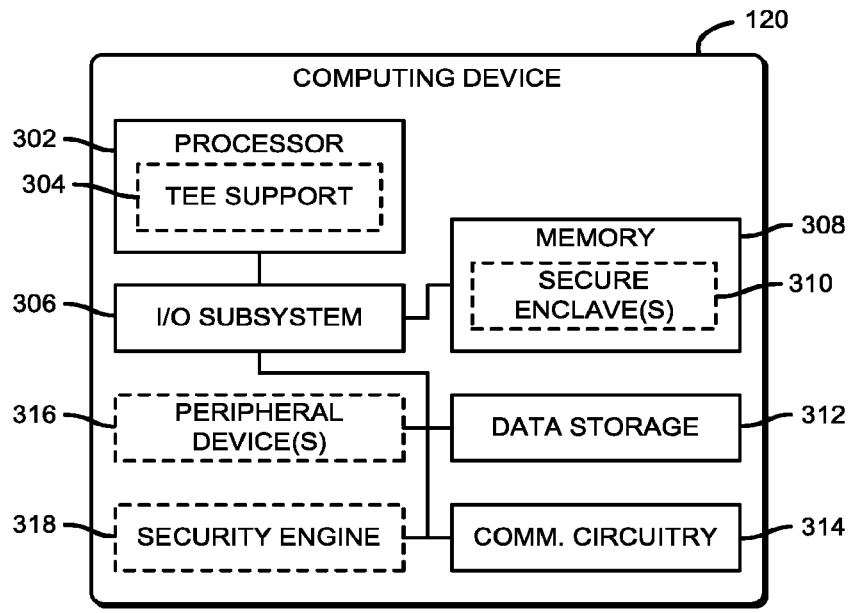
FIG. 3 is a simplified block diagram of at least one embodiment of a computing device of the system of FIG. 1.

As shown in FIG. 3, similar to the endpoint device 102 of FIG. 2, each of the illustrative computing devices 120 (e.g., the mobile edge computing device 106, the core computing device 110, the application provider computing device 114, and the network operator computing device 116) includes a processor 302 with a TEE support 304, an input/output (I/O) subsystem 306, a memory 308 with a secure enclave 310, a data storage device 312, communication circuitry 314, and in some embodiments, one or more peripheral devices 316 and/or a security engine 318. As such, further descriptions of the like components are not repeated herein for clarity of the description with the understanding that the description of the corresponding components provided above in regard to the endpoint device 102 applies equally to the corresponding components of each of the respective computing devices 120.

Of course, in other embodiments, the computing devices 120 may include additional or alternative components, such as those commonly found in a server, router, switch, or other network device. Additionally, in some embodiments, one or more of the illustrative components may be incorporated in, or otherwise form a portion of, another component. The peripheral devices 316, for example, may include any number of input/output devices, interface devices, ports, and/or other peripheral devices. For example, in some embodiments, the peripheral devices 316 may include a display, touch screen, graphics circuitry, keyboard, mouse, speaker system, and/or other input/output devices, interface devices, and/or peripheral devices.

The operator backhaul network 108 may be embodied as any type of backhaul portion (i.e., the intermediate links between the mobile edge computing device 106 and the core network) of the operator network 122. The owner/host cloud network 112 may be embodied as any type of core network (e.g., a data center) of the operator network 122. Accordingly, the operator backhaul network 108 and the owner/host cloud network 112 may be comprised of one or more physical and/or virtual network devices (e.g., switches, routers, access points, etc.) capable of managing network traffic (e.g., forwarding, processing, filtering, etc.) through the operator network 122. The operator network 122 may be any type of telephony network orchestrated or otherwise managed by an operator (e.g., a wireless telephone service provider).

Figure 4:
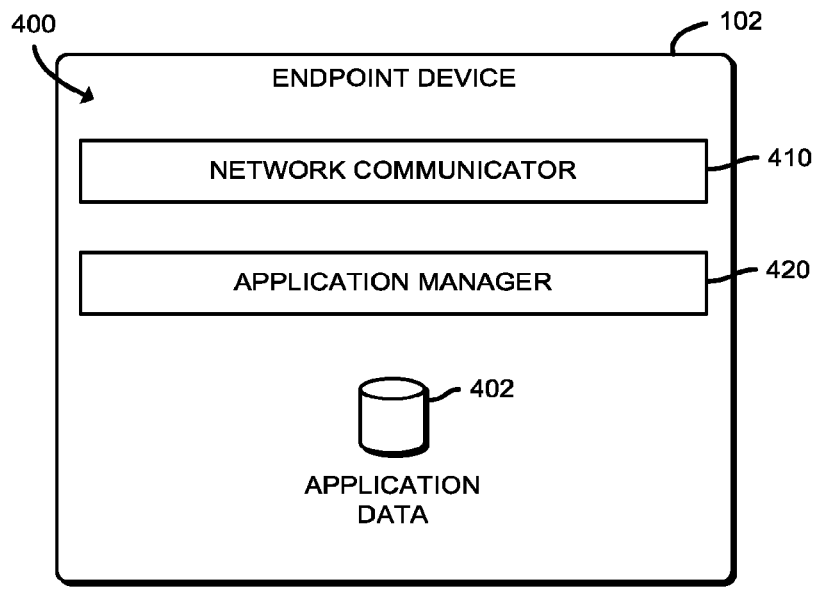
FIG. 4 is a simplified block diagram of at least one embodiment of an environment of the endpoint device of FIGS. 1 and 2.

Referring now to FIG. 4, in use, the endpoint device 102 establishes an environment 400 during operation. The illustrative environment 400 includes a network communicator 410 and an application manager 420. The various components of the environment 400 may be embodied as hardware, firmware, software, or a combination thereof. As such, in some embodiments, one or more of the components of the environment 400 may be embodied as circuitry or collection of electrical devices (e.g., a network communication circuit 410, an application management circuit 420, etc.).

It should be appreciated that, in such embodiments, one or more of the network communication circuit 410 and the application management circuit 420 may form a portion of one or more of the processor 202, the I/O subsystem 206, the communication circuitry 214, and/or other components of the endpoint device 102. Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the processor 202 or other components of the endpoint device 102.

In the illustrative environment 400, the endpoint device 102 additionally includes application data 402, which may be accessed by the various components and/or sub-components of the endpoint device 102. Although the various data utilized by the endpoint device 102 is described herein as particular discrete data, such data may be combined, aggregated, and/or otherwise form portions of a single or multiple data sets, including duplicative copies, in other embodiments. It should be appreciated that the endpoint device 102 may include other components, sub-components, modules, sub-modules, logic, sub-logic, and/or devices commonly found in a computing device, which are not illustrated in FIG. 4 for clarity of the description.

The network communicator 410, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the endpoint device 102. To do so, the network communicator 410 is configured to prepare and transmit network packets to other computing devices (e.g., the mobile edge computing device 106). Further, the network communicator 410 is configured to receive and process network packets from the other computing devices (e.g., the mobile edge computing device 106). Accordingly, in some embodiments, at least a portion of the functionality of the network communicator 410 may be performed by the communication circuitry 214.

The application manager 420, which may be embodied as hardware, firmware, software, virtualized hardware, emulated architecture, and/or a combination thereof as discussed above, is configured to manage the various applications and services installed on the endpoint device 102. Additionally, the application manager 420 is configured to generate requests for the applications that are not stored local to the endpoint device 102. Such requests may be transmitted from the application manager 420 (e.g., via the network communicator 410) to the mobile edge computing device 106. It should be appreciated that some applications may be streamed from a remote computing device (e.g., an application provider computing device 114) to the endpoint device 102. In other words, such streamed applications may not be locally installed applications (e.g., a thick application), but rather portions of the application may be received from the remote computing device and processed locally based on a present state of use (e.g., a thin application).

In some embodiments, the application manager 420 may be configured to interface with the user of the endpoint device 102 via one or more user interfaces to facilitate interactions, such as option selections, settings changes, etc., between the services and/or applications presently running on the endpoint device 102, or being requested by the endpoint device 102, and the user interfacing components of the endpoint device 102 (e.g., one or more of the peripheral device(s) 316). The options/settings associated with a particular application may be stored in the application data 402, in some embodiments. The user interfaces may be usable by a user of the endpoint device 102 to interact with the services and/or applications presently running on the endpoint device 102. For example, one or more of the user interfaces may be usable by the user to request access to a particular application, which may be processed by the application manager 420. In another example, one or more of the user interfaces may be usable to present a cost associated with accessing the application (e.g., as may be presented upon a failure to negotiate the access automatically), as well as provide an option to purchase the application and/or the access thereto.

Figure 5:
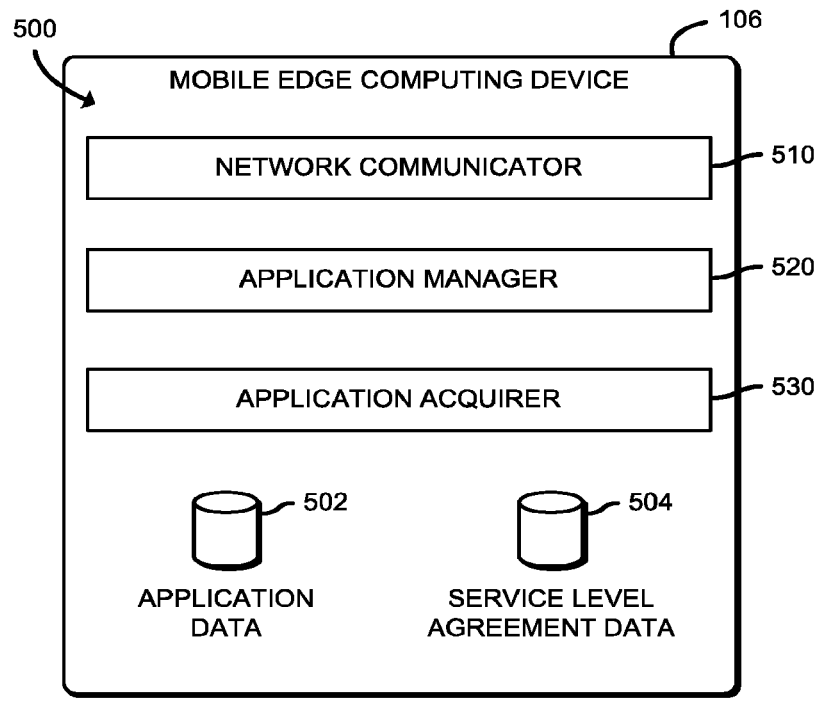
FIG. 5 is a simplified block diagram of at least one embodiment of an environment of a mobile edge computing device of the system of FIG. 1.

Referring now to FIG. 5, in use, the mobile edge computing device 106 establishes an environment 500 during operation. The illustrative environment 500 includes a network communicator 510, an application manager 520, and an application acquirer 530. The various components of the environment 500 may be embodied as hardware, firmware, software, or a combination thereof. As such, in some embodiments, one or more of the components of the environment 500 may be embodied as circuitry or collection of electrical devices (e.g., a network communication circuit 510, an application management circuit 520, an application acquisition circuit 530, etc.).

It should be appreciated that, in such embodiments, one or more of the network communication circuit 510, the application management circuit 520, and the application acquisition circuit 530 may form a portion of one or more of the processor 302, the I/O subsystem 306, the communication circuitry 314, and/or other components of the mobile edge computing device 106. Additionally, in some embodiments, one or more of the illustrative components may form a portion of another component and/or one or more of the illustrative components may be independent of one another. Further, in some embodiments, one or more of the components of the environment 500 may be embodied as virtualized hardware components or emulated architecture, which may be established and maintained by the processor 302 or other components of the mobile edge computing device 106.

In the illustrative environment 500, the mobile edge computing device 106 includes application data 502 and SLA data 504, each of which may be accessed by the various components and/or sub-components of the mobile edge computing device 106. Additionally, it should be appreciated that, in some embodiments, the data stored in, or otherwise represented by, each of the application data 502 and the SLA data 504 may not be mutually exclusive relative to each other. For example, in some implementations, data stored in the application data 502 may also be stored as a portion of the SLA data 504, or vice versa. As such, although the various data utilized by the mobile edge computing device 106 is described herein as particular discrete data, such data may be combined, aggregated, and/or otherwise form portions of a single or multiple data sets, including duplicative copies, in other embodiments. It should be further appreciated that the mobile edge computing device 106 may include additional and/or alternative components, sub-components, modules, sub-modules, logic, sub-logic, and/or devices commonly found in a network computing device, which are not illustrated in FIG. 5 for clarity of the description.

The network communicator 510, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the mobile edge computing device 106. To do so, the network communicator 510 is configured to prepare and transmit network packets to other computing devices (e.g., the endpoint device 102, the core computing device 110, etc.). Further, the network communicator 510 is configured to receive and process network packets from the other computing devices (e.g., the endpoint device 102, the core computing device 110, etc.). Accordingly, in some embodiments, at least a portion of the functionality of the network communicator 510 may be performed by the communication circuitry 314 of the mobile edge computing device 106.

The application manager 520, which may be embodied as hardware, firmware, software, virtualized hardware, emulated architecture, and/or a combination thereof as discussed above, is configured to manage one or more applications and/or services stored at the mobile edge computing device 106. It should be appreciated that, in some embodiments, one or more applications and/or services being executed on the endpoint device 102 may be streamed from the mobile edge computing device 106. In other words, at least a portion of the application and/or service may be transmitted to the endpoint device 102 from the mobile edge computing device 106 (e.g., via the network communicator 510) for processing (e.g., output) by the endpoint device 102.

Additionally, in some embodiments, a portion of the processing may be performed by the mobile edge computing device 106 (e.g., by the application manager 520) and the data resulting therefrom may be transmitted to the endpoint device 102. For example, certain types of requested content (e.g., digital media content) or content otherwise associated with an application may be processed by the mobile edge computing device 106 and at least a portion of the processed content may be streamed to the endpoint device 102 (e.g., for output therefrom). In some embodiments, the application manager 520 may store data related to the application and/or services in the application data 502.

The application acquirer 530, which may be embodied as hardware, firmware, software, virtualized hardware, emulated architecture, and/or a combination thereof as discussed above, is configured to acquire applications from the application provider computing device 114 (e.g., via the core computing device 110). To do so, the mobile edge computing device 106 is configured to first determine whether the requested application is stored local to the mobile edge computing device 106, a function which may be orchestrated between the application acquirer 530 and the application manager 520. If the requested application is not stored local to the mobile edge computing device 106, the application acquirer 530 is configured to generate or forward a received request requesting access to a particular application, such as may be received from the endpoint device 102. The request is usable by the receiving computing device (e.g., the application provider computing device 114) to determine which application has been requested by the endpoint device 102.

In embodiments in which the requested application is stored local to the mobile edge computing device 106 or the requested application has been received from the application provider computing device 114, at least a portion of the requested application may be transmitted to the endpoint device 102 while the negotiation sequence is taking place. It should be appreciated that, in such embodiments, the portion of the requested application transmitted may not be a fully functional portion of the application, but may be delivered to the user in real time to enable user interaction with the application while the negotiation is taking place. In such embodiments, the application acquirer 530 is further configured to determine whether an SLA for the application and the user requesting the application has previously been negotiated and is still current. If not, the application acquirer 530 is configured to generate a message requesting a quote that is to be transmitted to the application provider computing device 114 (e.g., via the core computing device 110). Otherwise, the application acquirer 530 is configured to transmit any application and/or monitoring parameters to the user (i.e., via the endpoint device 102). In some embodiments, the SLA and/or data related thereto may be stored in the SLA data 504.

In some embodiments, the application and/or monitoring parameters may additionally include an offer to upgrade one or more of the application parameters, such as a level or amount of bandwidth, a video quality level, an audio quality level, etc., along with a cost (e.g., an amount of currency) associated with each offered upgrade. Upon receiving an indication from the user (i.e., via the endpoint device 102) that an offer is accepted, the application acquirer 530 is additionally configured to forward the acceptance to the network operator computing device 116, such that the network operator computing device 116 can manage the billing of the upgrades to the user.

Figure 6:
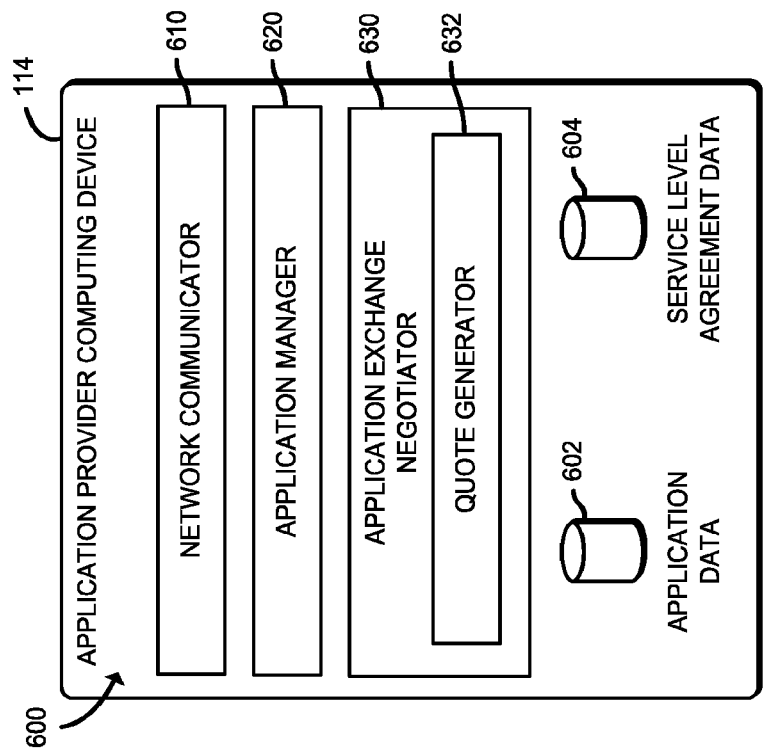
FIG. 6 is a simplified block diagram of at least one embodiment of an environment of an application provider computing device of the system of FIG. 1.

Referring now to FIG. 6, in use, the application provider computing device 114 establishes an environment 600 during operation. The illustrative environment 600 includes a network communicator 610, an application manager 620, and an application exchange negotiator 630. The various components of the environment 600 may be embodied as hardware, firmware, software, or a combination thereof. As such, in some embodiments, one or more of the components of the environment 600 may be embodied as circuitry or collection of electrical devices (e.g., a network communication circuit 610, an application management circuit 620, an application exchange negotiation circuit 630, etc.).

It should be appreciated that, in such embodiments, one or more of the network communication circuit 610, the application management circuit 620, and the application exchange negotiation circuit 630 may form a portion of one or more of the processor 302, the I/O subsystem 306, the communication circuitry 314, and/or other components of the application provider computing device 114. Additionally, in some embodiments, one or more of the illustrative components may form a portion of another component and/or one or more of the illustrative components may be independent of one another. Further, in some embodiments, one or more of the components of the environment 600 may be embodied as virtualized hardware components or emulated architecture, which may be established and maintained by the processor 302 or other components of the application provider computing device 114.

In the illustrative environment 600, the application provider computing device 114 includes application data 602 and SLA data 604, each of which may be accessed by the various components and/or sub-components of the application provider computing device 114. Additionally, it should be appreciated that, in some embodiments, the data stored in, or otherwise represented by, each of the application data 602 and the SLA data 604 may not be mutually exclusive relative to each other. For example, in some implementations, data stored in the application data 602 may also be stored as a portion of the SLA data 604, or vice versa. As such, although the various data utilized by the application provider computing device 114 is described herein as particular discrete data, such data may be combined, aggregated, and/or otherwise form portions of a single or multiple data sets, including duplicative copies, in other embodiments. It should be further appreciated that the application provider computing device 114 may include additional and/or alternative components, sub-components, modules, sub-modules, logic, sub-logic, and/or devices commonly found in a network computing device, which are not illustrated in FIG. 6 for clarity of the description.

The network communicator 610, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the application provider computing device 114. To do so, the network communicator 610 is configured to prepare and transmit network packets to other computing devices (e.g., the network operator computing device 116, the core computing device 110, etc.). Further, the network communicator 610 is configured to receive and process network packets from the other computing devices (e.g., the network operator computing device 116, the core computing device 110, etc.). Accordingly, in some embodiments, at least a portion of the functionality of the network communicator 610 may be performed by the communication circuitry 314 of the application provider computing device 114.

The application manager 620, which may be embodied as hardware, firmware, software, virtualized hardware, emulated architecture, and/or a combination thereof as discussed above, is configured to manage one or more applications and/or services stored at the application provider computing device 114. To do so, the application manager 620 is configured to store the applications at a particular location and provide a URL such that the application may be retrieved by another computing device. The application manager 620 is further configured to transmit the applications and/or services stored at the application provider computing device 114 upon request and successful negotiation of an SLA between the application provider computing device 114 and the network operator computing device 116 for a particular user and the requested application. In some embodiments, information of the applications and/or services may be stored in the application data 602.

The application exchange negotiator 630, which may be embodied as hardware, firmware, software, virtualized hardware, emulated architecture, and/or a combination thereof as discussed above, is configured to autonomously (i.e., without user intervention) perform the application exchange negotiation between the application provider computing device 114 and the network operator computing device 116. To do so, the illustrative application exchange negotiator 630 includes a quote generator 632. It should be appreciated that the quote generator 632 may be separately embodied as hardware, firmware, software, virtualized hardware, emulated architecture, and/or a combination thereof. For example, in some embodiments, the quote generator 632 may be embodied as a hardware component, while in other embodiments the quote generator 632 may be embodied as a virtualized hardware component or as some other combination of hardware, firmware, software, virtualized hardware, emulated architecture, and/or a combination thereof.

The quote generator 632 is configured to receive a request to generate a quote from the endpoint device 102 (e.g., in response to a request to access an application and/or service provided by the application provider computing device 114) and transmit the generated quote to the network operator computing device 116. To do so, the application exchange negotiator 630 may retrieve data related to a previously negotiated SLA, such as may be stored in the SLA data 604, or negotiate an SLA as part of the application exchange negotiation. The retrieved data may include one or more application parameters usable to define an attribute of the application and/or the streaming thereof, such as a duration of time, a level or amount of bandwidth, a video quality level, an audio quality level, etc., as well as a cost (e.g., an amount of currency) associated with each parameter at a particular amount of level.

As described previously, the quote may include any information related to the application exchange, such as a radio frequency, a radio quality, a mobility of the endpoint device 102, a resolution, a user SLA with the operator/application owner, a usage time, etc. As also described previously, the quote may additionally and/or alternatively include an amount of time allotted for negotiation of the service level agreement, a current negotiated price, etc. The quote generator 632 is further configured to update a quote previously presented to the network operator computing device 116 and subsequently rejected (i.e., a rejected quote).

Figure 7:
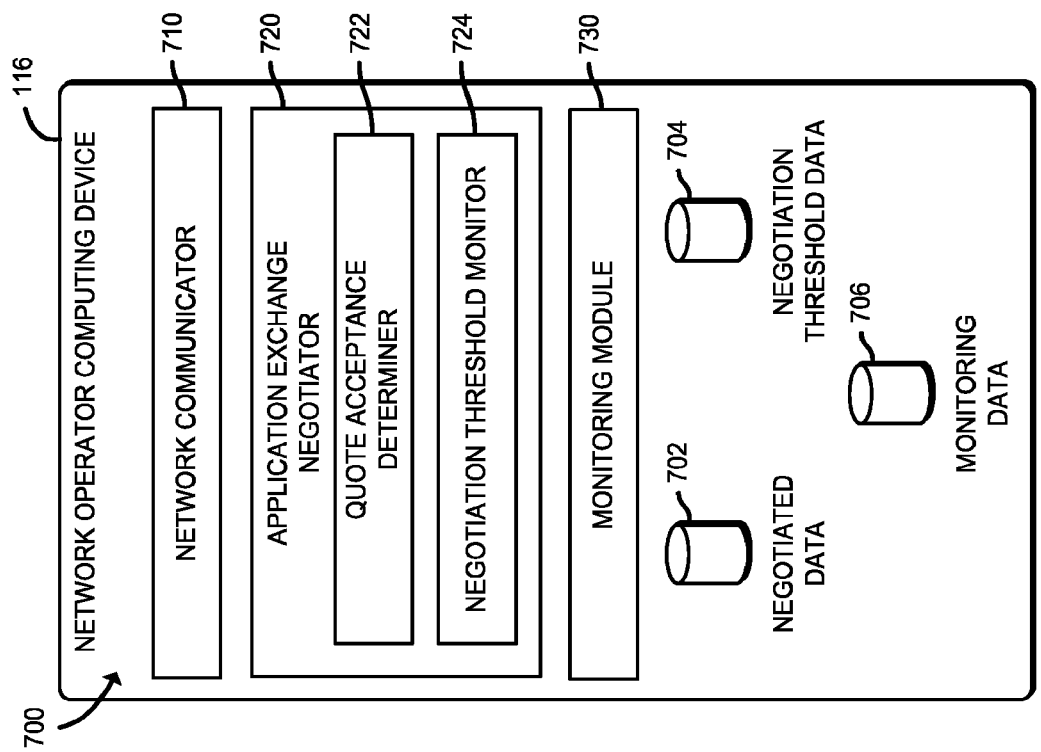
FIG. 7 is a simplified block diagram of at least one embodiment of an environment of an network operator computing device of the system of FIG. 1.

Referring now to FIG. 7, in use, the network operator computing device 116 establishes an environment 700 during operation. The illustrative environment 700 includes a network communicator 710, an application exchange negotiator 720, and a monitoring module 730. The various components of the environment 700 may be embodied as hardware, firmware, software, or a combination thereof. As such, in some embodiments, one or more of the components of the environment 700 may be embodied as circuitry or collection of electrical devices (e.g., a network communication circuit 710, an application exchange negotiation circuit 720, monitoring circuit 730, etc.).

It should be appreciated that, in such embodiments, one or more of the network communication circuit 710, the application exchange negotiation circuit 720, and the monitoring circuit 730 may form a portion of one or more of the processor 302, the I/O subsystem 306, the communication circuitry 314, and/or other components of the network operator computing device 116. Additionally, in some embodiments, one or more of the illustrative components may form a portion of another component and/or one or more of the illustrative components may be independent of one another. Further, in some embodiments, one or more of the components of the environment 700 may be embodied as virtualized hardware components or emulated architecture, which may be established and maintained by the processor 302 or other components of the network operator computing device 116.

In the illustrative environment 700, the network operator computing device 116 includes negotiated data 702, negotiation threshold data 704, and monitoring data 706, each of which may be accessed by the various components and/or sub-components of the network operator computing device 116. Additionally, it should be appreciated that, in some embodiments, the data stored in, or otherwise represented by, each of the negotiated data 702, the negotiation threshold data 704, and the monitoring data 706 may not be mutually exclusive relative to each other. For example, in some implementations, data stored in the negotiated data 702 may also be stored as a portion of the negotiation threshold data 704 and/or the monitoring data 706, or vice versa. As such, although the various data utilized by the network operator computing device 116 is described herein as particular discrete data, such data may be combined, aggregated, and/or otherwise form portions of a single or multiple data sets, including duplicative copies, in other embodiments. It should be further appreciated that the network operator computing device 116 may include additional and/or alternative components, sub-components, modules, sub-modules, logic, sub-logic, and/or devices commonly found in a network computing device, which are not illustrated in FIG. 7 for clarity of the description.

The network communicator 710, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network operator computing device 116. To do so, the network communicator 710 is configured to prepare and transmit network packets to other computing devices (e.g., the application provider computing device 114, the core computing device 110, etc.). Further, the network communicator 710 is configured to receive and process network packets from the other computing devices (e.g., the application provider computing device 114, the core computing device 110, etc.). Accordingly, in some embodiments, at least a portion of the functionality of the network communicator 710 may be performed by the communication circuitry 314 of the network operator computing device 116.

The application exchange negotiator 720, which may be embodied as hardware, firmware, software, virtualized hardware, emulated architecture, and/or a combination thereof as discussed above, is configured to autonomously (i.e., without user intervention) perform the application exchange negotiation between the network operator computing device 116 and the application provider computing device 114. To do so, the illustrative application exchange negotiator 720 includes a quote acceptance determiner 722 and a negotiation threshold monitor 724. It should be appreciated that each of the quote acceptance determiner 722 and the negotiation threshold monitor 724 of the application exchange negotiator 720 may be separately embodied as hardware, firmware, software, virtualized hardware, emulated architecture, and/or a combination thereof. For example, the quote acceptance determiner 722 may be embodied as a hardware component, while the negotiation threshold monitor 724 may be embodied as a virtualized hardware component or as some other combination of hardware, firmware, software, virtualized hardware, emulated architecture, and/or a combination thereof.

The quote acceptance determiner 722 is configured to analyze a received application exchange negotiation quote from the application provider computing device 114 to determine whether to accept or reject the terms of the quote. As described previously, the quote may include any information related to the application exchange, such as a radio frequency, a radio quality, a mobility of the endpoint device 102, a resolution, a user SLA with the operator/application owner, a usage time, etc. As also described previously, the quote may additionally and/or alternatively include an amount of time allotted for negotiation of the service level agreement, a current negotiated price, etc. The quote acceptance determiner 722 is further configured to update a quote previously adjusted and transmitted back to the application provider computing device 114 that was previously rejected (i.e., a rejected quote). In some embodiments, the information (i.e., terms) of the quote may be stored in the negotiated data 702.

The negotiation threshold monitor 724 is configured to monitor a negotiation threshold to determine whether the application exchange negotiation has exceeded the threshold. Such negotiation thresholds may include any threshold that may result in a determination that the application exchange negotiation should not proceed. For example, the negotiation threshold may include a maximum amount of time allotted for negotiation, a maximum number of negotiation cycles (i.e., a rejection by the application provider computing device 114 and/or the network operator computing device 116), etc. In an illustrative example, the negotiation threshold monitor 724 may determine the time allotment negotiation threshold by adding the endpoint to endpoint latency of each hop between the endpoint device 102 and the application provider computing device 114, as well as a usage time relation to usage of a portion of the application (e.g., the portion provided to allow the user to interact with the application or service during the negotiation). In some embodiments, the negotiation threshold and/or data related thereto may be stored in the negotiation threshold data 704.

The monitoring module 730, which may be embodied as hardware, firmware, software, virtualized hardware, emulated architecture, and/or a combination thereof as discussed above, is configured to monitor the usage/access of the application through the operator network 122. To do so, the monitoring module 730 is configured to determine which parameters of the SLA to monitor, such as may have been determined during the application exchange negotiation performed by the negotiation threshold monitor 724, and monitor those determined parameters during use of the application over the operator network 122. In some embodiments, the results of the parameter monitoring may be stored in the monitoring data 706.

Referring now to FIGS. 8-11, in use, the mobile edge computing device 106 may execute a method 800 for performing an automated application exchange in a wireless network (e.g., the operator network 122). It should be appreciated that, in some embodiments, the method 800 may be embodied as various instructions stored on a computer-readable media, which may be executed by a processor (e.g., the processor 302), the communication circuitry 314, and/or other components of the mobile edge computing device 106 to cause the mobile edge computing device 106 to perform the method 800. The computer-readable media may be embodied as any type of media capable of being read by the mobile edge computing device 106 including, but not limited to, the memory 308, the data storage device 312, other memory or data storage devices of the mobile edge computing device 106, portable media readable by a peripheral device of the mobile edge computing device 106, and/or other media.

The method 800 begins with block 802, in which the mobile edge computing device 106 determines whether an application request has been received from an endpoint device (e.g., the endpoint device 102 of FIG. 1). If so, the method 800 advances to block 804, in which the mobile edge computing device 106 determines a present location of the requested application (e.g., in the memory 308). In block 806, the mobile edge computing device 106 determines whether the requested application is stored local to the mobile edge computing device 106 (e.g., stored in the memory 308). If the application is determined to be stored local to the mobile edge computing device 106, the method 800 branches to block 808 of FIG. 9; otherwise, the method 800 branches to block 824, which is described below.

In some embodiments, in block 808, the mobile edge computing device 106 transmits a portion of the requested application to the endpoint device 102 that requested access to the application. In block 810, the mobile edge computing device 106 determines whether an SLA is available (i.e., has previously been negotiated for the user and the application and is still valid). If the mobile edge computing device 106 determines an SLA is available, the method 800 branches to block 816 described below; otherwise, the method 800 branches to block 812, in which the mobile edge computing device 106 initiates an automated application exchange negotiation (see, e.g., the automated application exchange negotiation of FIGS. 11 and 12). For example, the mobile edge computing device 106 may transmit a request for an application exchange negotiation quote to the application provider computing device 114 (i.e., the owner of the requested application). The request may include one or more parameters of the requested application as requested by the user and received from the endpoint device 102, such as one or more SLA terms. In block 814, the mobile edge computing device 106 determines whether the application exchange negotiation was successfully completed between the application provider computing device 114 and the network operator computing device 116. If so, the method 800 advances to block 816.

In block 816, the mobile edge computing device 106 transmits the application to the endpoint device. As described previously, the application may be executed by the endpoint device 102, but processed and run on the mobile edge computing device 106 and streamed to the endpoint device 102. In some embodiments, in block 818, the mobile edge computing device 106 may additionally transmit one or more parameters of the application to be monitored during access/use of the application. Such monitored parameters may include bandwidth usage, a quality level, quality of service data, telemetry data, etc. Additionally or alternatively, in some embodiments, in block 820, the mobile edge computing device 106 transmits an offer to upgrade one or more parameters of the application. Such parameters may include additional bandwidth, an upgraded quality level, etc., as well as a cost associated with each upgrade offered. In block 822, the mobile edge computing device 106 transmits a message to the network operator computing device 116 (e.g., via the core computing device 110) that includes billing information based on the terms of the successfully negotiated SLA. From block 822, the method 800 returns to block 802 to determine whether another application request has been received.

Figure 8:
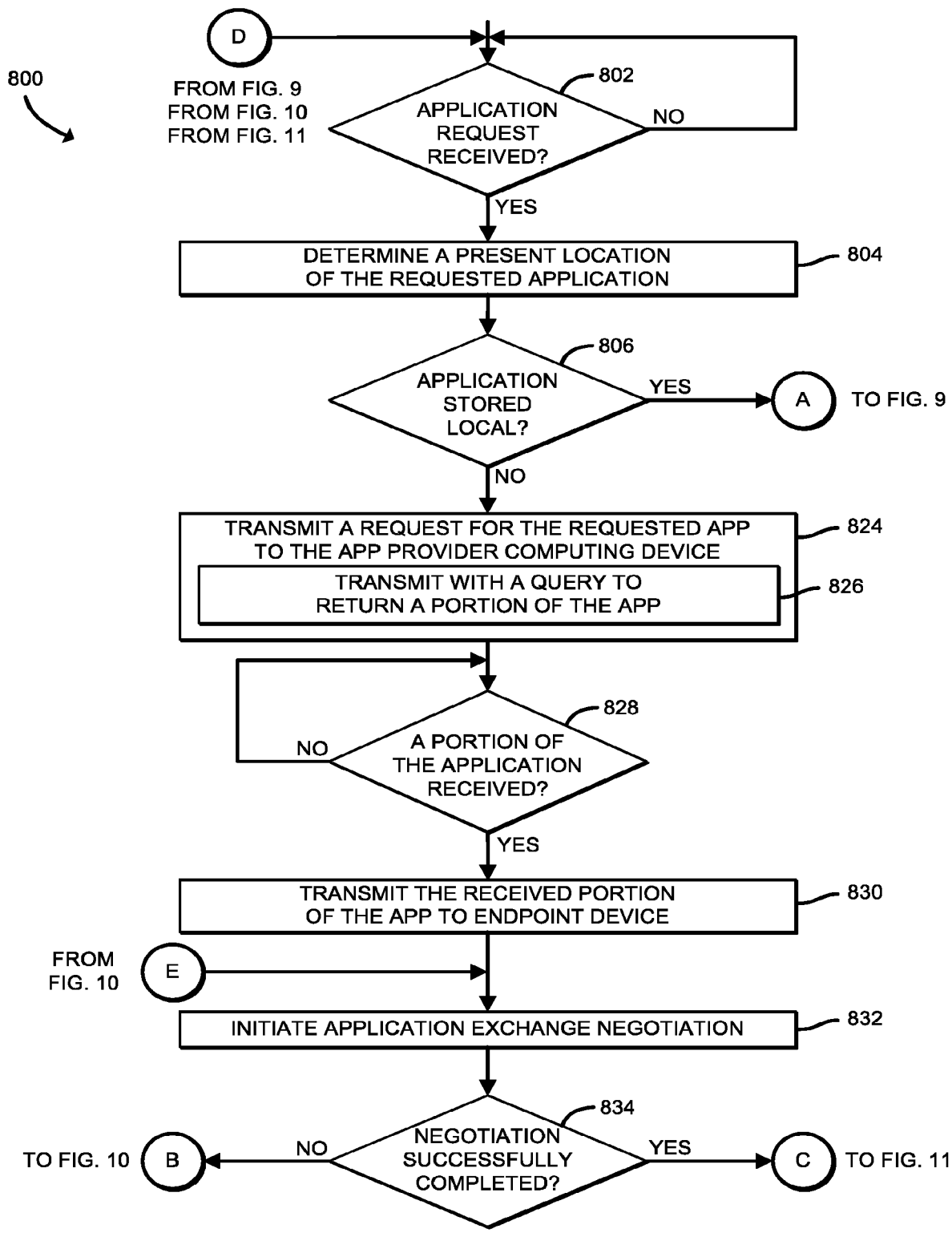
FIGS. 8-11 are a simplified flow diagram of at least one embodiment of a method for performing the automated application exchange in the wireless network that may be executed by the mobile edge computing device of FIGS. 1 and 5.
Figure 9:
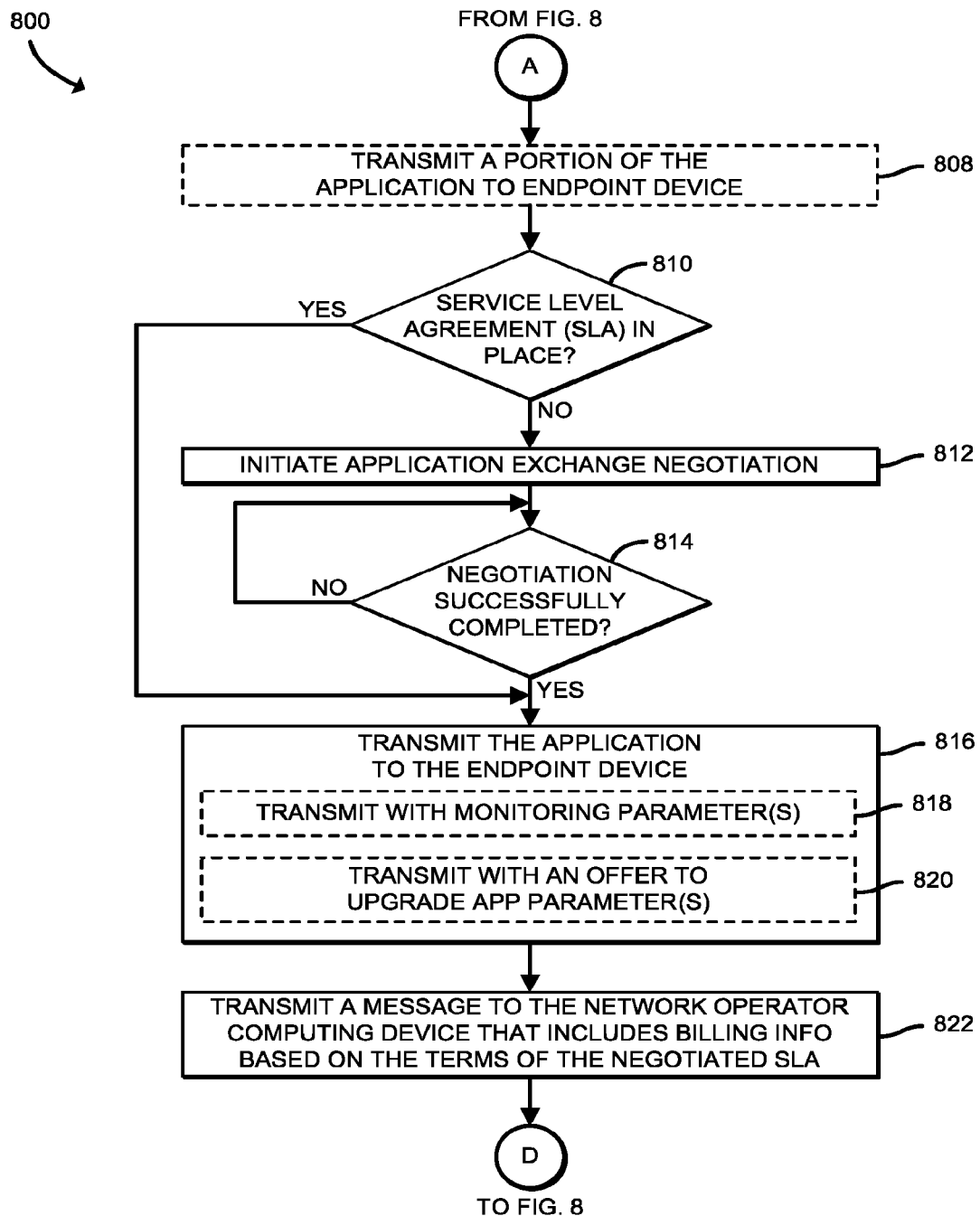
Figure 10:
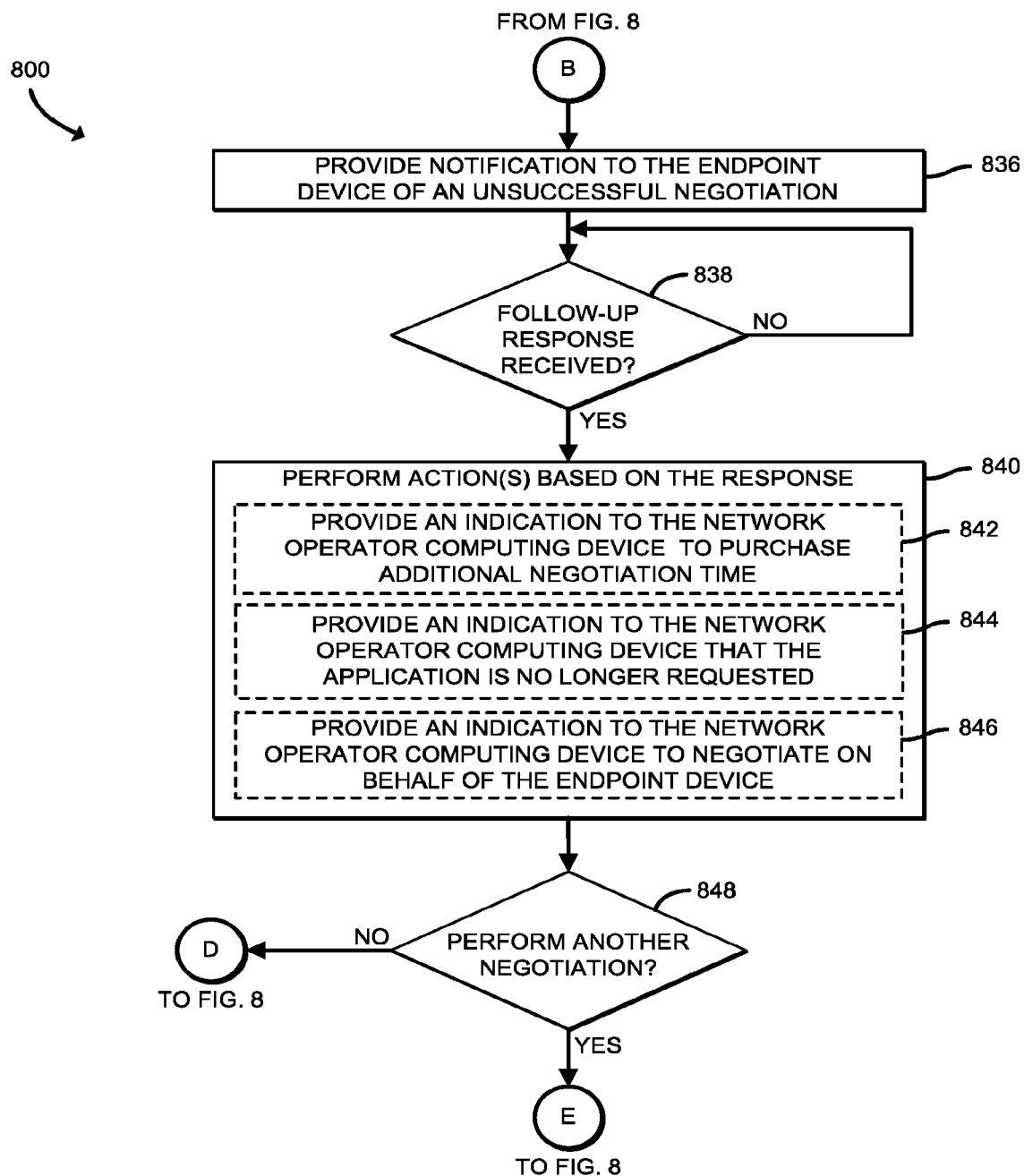

Referring back to block 806 of FIG. 8, as described previously, if the mobile edge computing device 106 determines the requested application is not stored local to the mobile edge computing device 106 (e.g., is stored at the application provider computing device 114), the method 800 branches to block 824. In block 824, the mobile edge computing device 106 transmits a request to the application provider computing device 114 (e.g., via the core computing device 110) requesting that the application provider computing device 114 transmit the application to the mobile edge computing device 106 or a location thereof, such as a URL corresponding to a storage location of the application at the application provider computing device 114. As described previously, the request may include an identifier of the application being requested, such that the application provider computing device 114 can identify the requested application stored thereon.

Additionally, in block 826, the mobile edge computing device 106 transmits a query to the application provider computing device 114 requesting that the application provider computing device 114 return a portion of the application usable to initiate user interaction during the automated application exchange negotiation. Accordingly, the mobile edge computing device 106 may either transmit or stream to the endpoint device 102 during subsequent negotiations so as to not give the appearance of latency to the user of the endpoint device 102 during the negotiation process. It should be appreciated that, in some embodiments, the query of block 826 may result in an indication being received that indicates whether the portion of the requested application is available. In such embodiments, a result that indicates the portion is not available may be received by the mobile edge computing device 106, and accordingly, block 726 may be skipped.

In block 828, the mobile edge computing device 106 determines whether the requested portion of the application has been received. If so, the method 800 advances to block 830, in which the mobile edge computing device 106 transmits the received portion of the application to the endpoint device 102 that requested access to the application. In some embodiments, the mobile edge computing device 106 may transmit the portion of the application received to the endpoint device 102, or otherwise stream a portion of the application to the endpoint device 102 while another portion of the application is being processed by the mobile edge computing device 106. In block 832, the mobile edge computing device 106 initiates an automated application exchange negotiation. To do so, similar to block 812 described above, the mobile edge computing device 106 may transmit a request for an application exchange negotiation quote to the application provider computing device 114. In block 834, the mobile edge computing device 106 determines whether the automated application exchange negotiation has been successfully completed. If so, the method 800 branches to block 836 of FIG. 10; otherwise, the method 800 branches to block 850 of FIG. 11.

In block 836, the mobile edge computing device 106 provides a notification to the endpoint device 102 indicating that the automated application exchange negotiation was not successful. In block 838, the mobile edge computing device 106 determines whether a follow-up response to the notification provided in block 836 has been received. It should be appreciated that, in some embodiments, the method 800 may time out at certain parts of the method 800 waiting for such responses and return to block 802 of FIG. 8 to determine whether another application request has been received.

If the mobile edge computing device 106 determines that a follow-up response to the notification provided in block 836 has been received, the method 800 advances to block 840, in which the mobile edge computing device 106 performs an action based on the received response. In some embodiments, in block 842, the mobile edge computing device 106 may provide an indication to the network operator computing device that additional negotiation time is to be purchased on behalf of the endpoint device 102 (i.e., the user of the endpoint device 102). Alternatively, in some embodiments, in block 844, the mobile edge computing device 106 may provide an indication to the network operator computing device 116 and/or the application provider computing device 114 that the application is no longer being requested. Additionally, in some embodiments, in block 846, the mobile edge computing device 106 may provide an indication to the network operator computing device 116 to negotiate with the application provider computing device 114 on behalf of the endpoint device 102.

In block 848, the mobile edge computing device 106 determines whether to perform another SLA negotiation based on the action taken in response to the response received at block 838. If the mobile edge computing device 106 determines not to continue with another round of SLA negotiations, the method 800 returns to block 802, wherein the mobile edge computing device 106 determines whether another application request was received. Otherwise, the method 800 branches to block 832 of FIG. 8, in which the mobile edge computing device 106 initiates another application exchange negotiation by transmitting additional and/or alternative terms of the application exchange for another round of SLA negotiations.

Figure 11:
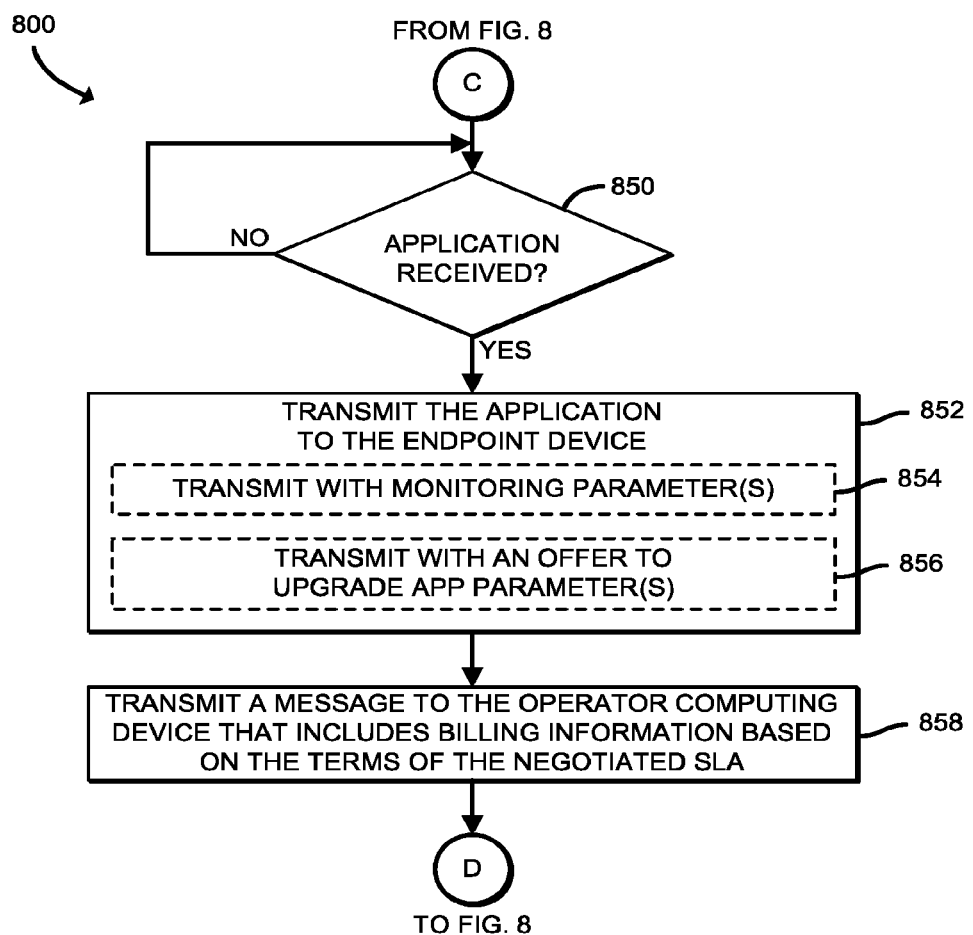

Referring now to block 850 of FIG. 11, the mobile edge computing device 106 determines whether the requested application has been received. If so, the method 800 advances to block 852, in which the mobile edge computing device 106 transmits the application to the endpoint device. In some embodiments, in block 854, the mobile edge computing device 106 may additionally transmit one or more parameters of the application to be monitored during access/use of the application. As described previously, such monitored parameters may include bandwidth usage, a quality level, quality of service data, telemetry data, etc. Additionally or alternatively, in some embodiments, in block 856, the mobile edge computing device 106 transmits an offer to upgrade one or more parameters of the application. As also described previously, such parameters may include additional bandwidth, an upgraded quality level (e.g., a higher resolution audio or video stream), etc., as well as a cost associated with each upgrade offered. In block 858, the mobile edge computing device 106 transmits a message to the network operator computing device 116 that includes billing information based on the terms of the successfully negotiated SLA. From block 858, the method 800 returns to block 802 of FIG. 8 to determine whether another application request has been received.

Figure 12:
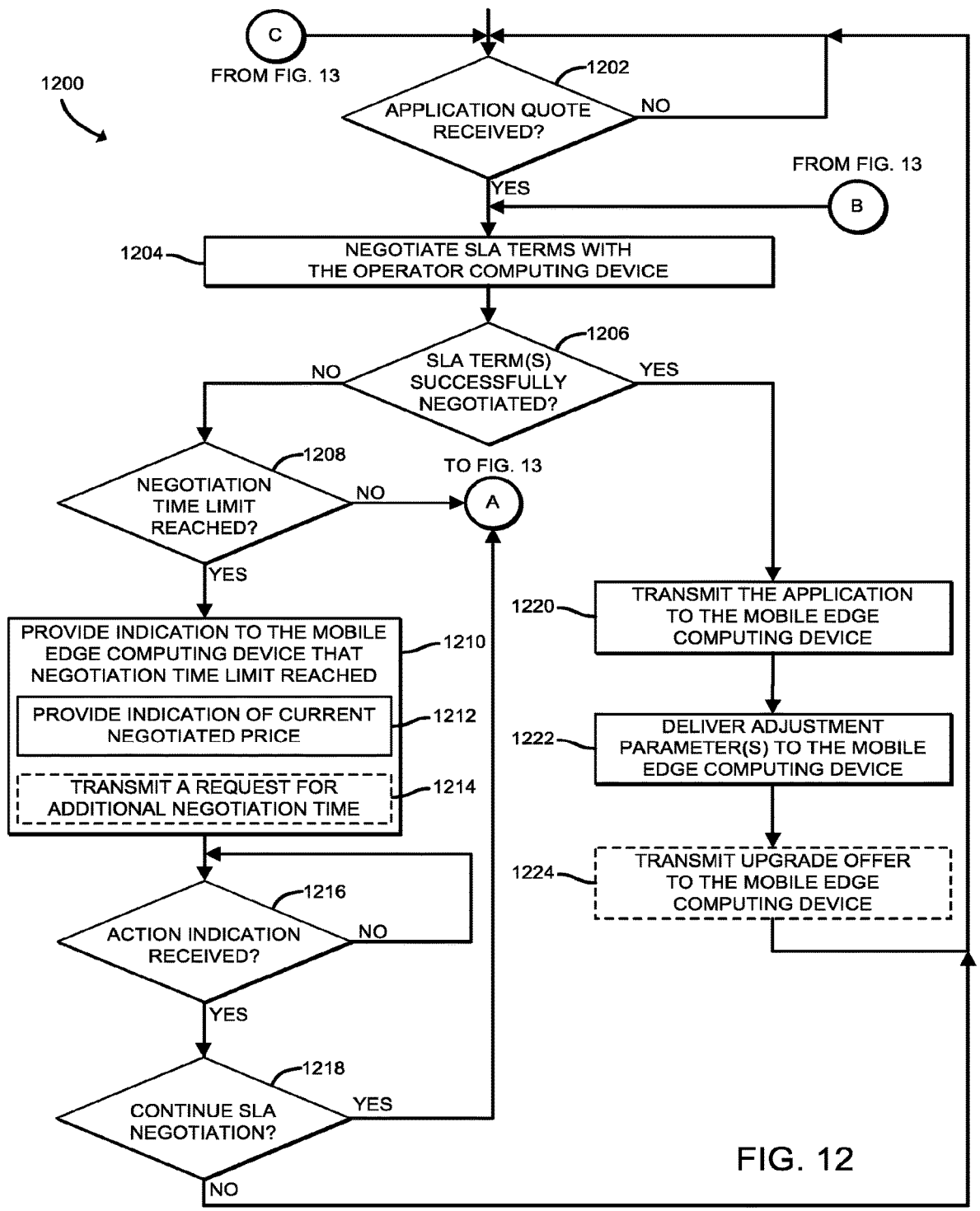
FIGS. 12 and 13 are a simplified flow diagram of at least one embodiment of a method for performing an SLA negotiation of the automated application exchange in the wireless network that may be executed by the application provider computing device of FIGS. 1 and 6.
Figure 13:
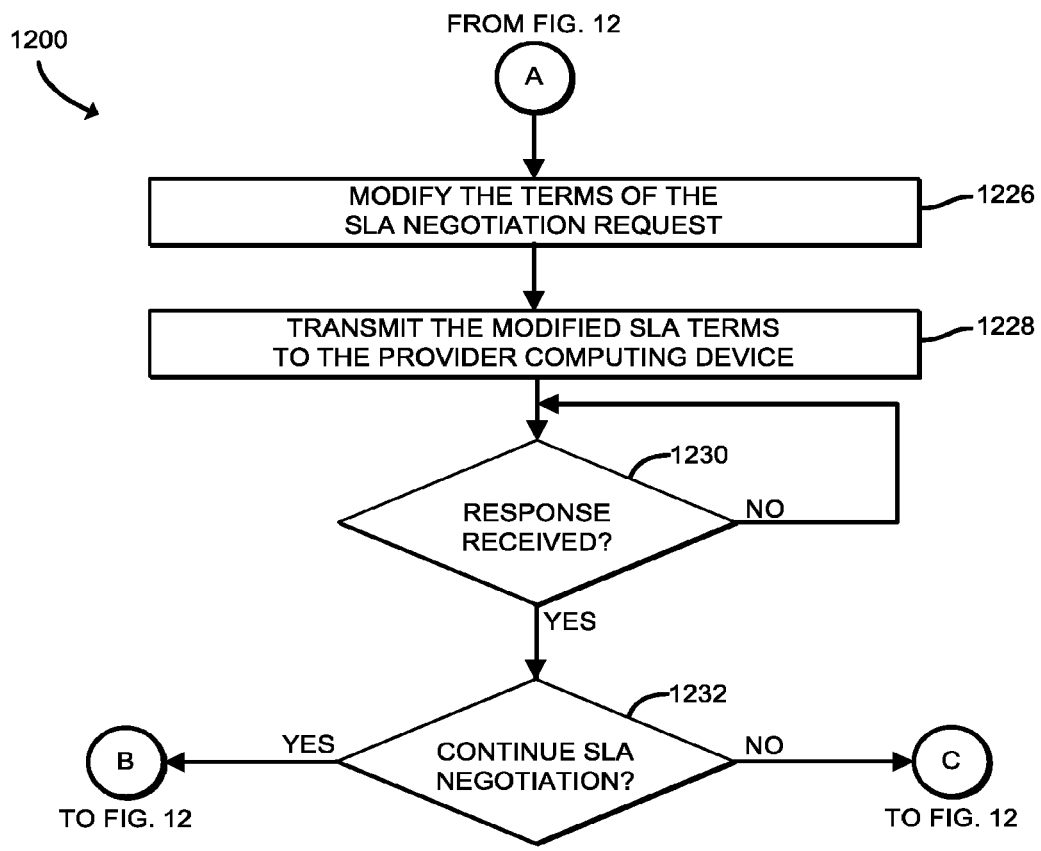

Referring now to FIGS. 12 and 13, in use, the application provider computing device 114 may execute a method 1200 for performing an SLA negotiation portion of the application exchange in a wireless network (e.g., the operator network 122). It should be appreciated that, in some embodiments, the method 1200 may be embodied as various instructions stored on a computer-readable media, which may be executed by a processor (e.g., the processor 302), the communication circuitry 314, and/or other components of the application provider computing device 114 to cause the application provider computing device 114 to perform the method 1200. The computer-readable media may be embodied as any type of media capable of being read by the application provider computing device 114 including, but not limited to, the memory 308, the data storage device 312, other memory or data storage devices of the application provider computing device 114, portable media readable by a peripheral device of the application provider computing device 114, and/or other media.

The method 1200 begins with block 1202, in which the application provider computing device 114 determines whether an application quote was received from an endpoint device (e.g., via the mobile edge computing device 106 and the core computing device 110). If so, the method 1200 advances to block 1204, in which the application provider computing device 114 negotiates SLA terms of the received application quote with the network operator computing device 116. In block 1206, the application provider computing device 114 determines whether the SLA terms were successfully negotiated. If so, the method 1200 branches to block 1220, which is described below. If not, the method 1200 advances to block 1208, in which the application provider computing device 114 determines whether a negotiation threshold was reached. If the application provider computing device 114 determines the negotiation threshold was reached, the method 1200 advances to block 1226, which is described below; otherwise, the method 1200 advances to block 1210.

In block 1210, the application provider computing device 114 provides an indication to the mobile edge computing device 106 that indicates the negotiation threshold has been reached. To do so, in block 1212, the application provider computing device 114 provides an indication of a currently negotiated price to the mobile edge computing device 106. Additionally, in some embodiments, in block 1214, the application provider computing device 114 may transmit a request for additional negotiation time, depending on the terms of the SLA, for example. In block 1216, the application provider computing device 114 determines whether an action indication has been received from the mobile edge computing device 106, in response to the indication provided in block 1210. If not, the method 1200 loops back to block 1216 to continue to wait for the action indication to be received. Otherwise, if the action indication has been received, the method 1200 advances to block 1218, in which the application provider computing device 114 determines whether the action indication indicated to continue SLA negotiation (i.e., perform another round of negotiations). If the application provider computing device 114 determines that the SLA negotiations are to continue, the method 1200 branches to block 1226, which will be described below. Otherwise, the method 1200 returns to block 1202, in which the application provider computing device 114 determines whether another application quote has been received.

Referring again to block 1206, as described previously, the method 1200 proceeds to block 1220 if the application provider computing device 114 determines the SLA terms were successfully negotiated. In block 1220, the application provider computing device 114 transmits the application to the mobile edge computing device 106. In block 1222, the application provider computing device 114 delivers one or more adjustment parameters to the mobile edge computing device 106. In some embodiments, in block 1224, the application provider computing device 114 may transmit an upgrade offer to the mobile edge computing device. Such an upgrade offer may include a higher resolution audio or video stream, for example.

Referring again to blocks 1208 and 1218, if the negotiation threshold was not reached in block 1208, or the action indication indicated to continue with SLA negotiations in block 1218, the method 1200 advances to block 1226. In block 1226, the application provider computing device 114 modifies the terms of the SLA negotiation request. In block 1228, the application provider computing device 114 transmits the modified SLA terms to the network operator computing device 116. In block 1230, the application provider computing device 114 determines whether a response has been received from the network operator computing device 116 in response to the modified SLA terms. It should appreciated that, in some embodiments, the method 1200 may time out waiting for such responses and return to block 1202 of FIG. 12 at certain parts of the method 1200 to determine whether another application quote has been received. If the application provider computing device 114 determines a response has been received from the network operator computing device 116 in response to the modified SLA terms, the method 1200 advances to block 1232.

In block 1232, the application provider computing device 114 determines whether the action indication indicates to continue with SLA negotiation. If not, the method 1200 returns to block 1202, wherein the application provider computing device 114 continues to determine whether another application quote was received. Otherwise, the method 1200 returns to block 1204, in which the application provider computing device 114 negotiates the updated SLA terms with the network operator computing device 116.

EXAMPLES

Illustrative examples of the technologies disclosed herein are provided below. An embodiment of the technologies may include any one or more, and any combination of, the examples described below.

Example 1 includes a mobile edge computing device for performing an automated application exchange negotiation in an operator network, the mobile edge computing device comprising one or more processors; and one or more memory devices having stored therein a plurality of instructions that, when executed by the one or more processors, cause the mobile edge computing device to receive an application request from an endpoint device in wireless communication with the mobile edge computing device; determine whether an application corresponding to the application request is stored at one of the mobile edge computing device or an application provider computing device; forward, in response to a determination that the application is stored at the application provider computing device, the application request to the application provider computing device; initiate, subsequent to forwarding the application request and in response to a determination that a service level agreement (SLA) is not presently available for the application requested, the automated application exchange negotiation between the application provider computing device and a network operator computing device, wherein the network operator computing device controls operations performed within the operator network; receive, from the application provider computing device, a result of the automated application exchange negotiation; and forward the result to the mobile edge computing device.

Example 2 includes the subject matter of Example 1, and wherein to initiate the automated application exchange negotiation comprises to transmit one or more terms of the SLA to the application provider computing device, wherein the one or more terms of the SLA are usable to perform the automated application exchange negotiation with the network operator computing device.

Example 3 includes the subject matter of any of Examples 1 and 2, and wherein the plurality of instructions further cause the mobile edge computing device to receive, subsequent to the result of the automated application exchange negotiation indicating the automated application exchange negotiation was successful, the application from the application provider computing device; and transmit at least a portion of the received application to the endpoint device.

Example 4 includes the subject matter of any of Examples 1-3, and wherein the plurality of instructions further cause the mobile edge computing device to perform an action as a function of the result, wherein to perform the action comprises to provide an indication to the network operator computing device to one of purchase additional negotiation time, indicate that the application is no longer requested, or perform the automated application exchange negotiation on behalf of the endpoint device.

Example 5 includes the subject matter of any of Examples 1-4, and wherein the plurality of instructions further cause the mobile edge computing device to notify an operator of the operator network to apply billing procedures based upon one or more terms of the SLA in response to a determination that the result indicates the automated application exchange negotiation was successful.

Example 6 includes the subject matter of any of Examples 1-5, and wherein the plurality of instructions further cause the mobile edge computing device to receive, subsequent to having received the result of the automated application exchange negotiation, an offer to upgrade one or more terms of the SLA; and transmit the offer to upgrade the one or more terms of the SLA to the endpoint device.

Example 7 includes the subject matter of any of Examples 1-6, and wherein the one or more terms of the SLA include at least one of a duration of time, an amount of bandwidth, a video quality level, and an audio quality level.

Example 8 includes the subject matter of any of Examples 1-7, and wherein the plurality of instructions further cause the mobile edge computing device to transmit, in response to a determination the requested application is stored local to the mobile edge computing device, at least a portion of the requested application to the endpoint device, wherein the at least a portion of the requested application is usable to initiate user interaction with the requested application.

Example 9 includes the subject matter of any of Examples 1-8, and wherein to transmit the at least the portion of the received application to the endpoint device comprises to (i) run the application on the mobile edge computing device and (ii) stream data related to the application to the endpoint device.

Example 10 includes the subject matter of any of Examples 1-9, and wherein the plurality of instructions further cause the mobile edge computing device to initiate the automated application exchange negotiation between the application provider computing device and the network operator computing device; and transmit, in response to a determination that the automated application exchange negotiation was successful, the requested application to the endpoint device.

Example 11 includes the subject matter of any of Examples 1-10, and wherein to transmit the requested application to the endpoint device includes to transmit at least one of one or more monitoring parameters and one or more upgrade offers.

Example 12 includes the subject matter of any of Examples 1-11, and wherein the one or more monitoring parameters include at least one of a bandwidth usage, a quality level, quality of service data, and telemetry data.

Example 13 includes the subject matter of any of Examples 1-12, and wherein the one or more upgrade offers include an amount of bandwidth, a video quality level, an audio quality level and a cost associated with each upgrade offer.

Example 14 includes a mobile edge computing device for performing an automated application exchange negotiation in an operator network, the mobile edge computing device comprising a network communicator to receive an application request from an endpoint device in wireless communication with the mobile edge computing device; an application manager to (i) determine whether an application corresponding to the application request is stored at one of the mobile edge computing device or an application provider computing device and (ii) forward, in response to a determination that the application is stored at the application provider computing device, the application request to the application provider computing device; and an application acquirer to initiate, subsequent to forwarding the application request and in response to a determination that a service level agreement (SLA) is not presently available for the application requested, the automated application exchange negotiation between the application provider computing device and a network operator computing device, wherein the network operator computing device controls operations performed within the operator network; wherein the network communicator is further to (i) receive, from the application provider computing device, a result of the automated application exchange negotiation and (ii) forward the result to the mobile edge computing device.

Example 15 includes the subject matter of Example 14, and wherein to initiate the automated application exchange negotiation comprises to transmit one or more terms of the SLA to the application provider computing device, wherein the one or more terms of the SLA are usable to perform the automated application exchange negotiation with the network operator computing device.

Example 16 includes the subject matter of any of Examples 14 and 15, and wherein the network communicator is further to receive, subsequent to the result of the automated application exchange negotiation indicating the automated application exchange negotiation was successful, the application from the application provider computing device; and transmit at least a portion of the received application to the endpoint device.

Example 17 includes the subject matter of any of Examples 14-16, and wherein the application acquirer is further to perform an action as a function of the result, wherein to perform the action comprises to provide an indication to the network operator computing device to one of purchase additional negotiation time, indicate that the application is no longer requested, or perform the automated application exchange negotiation on behalf of the endpoint device.

Example 18 includes the subject matter of any of Examples 14-17, and wherein the application acquirer is further to notify an operator of the operator network to apply billing procedures based upon one or more terms of the SLA in response to a determination that the result indicates the automated application exchange negotiation was successful.

Example 19 includes the subject matter of any of Examples 14-18, and wherein the network communicator is further to receive, subsequent to having received the result of the automated application exchange negotiation, an offer to upgrade one or more terms of the SLA; and transmit the offer to upgrade the one or more terms of the SLA to the endpoint device.

Example 20 includes the subject matter of any of Examples 14-19, and wherein the one or more terms of the SLA include at least one of a duration of time, an amount of bandwidth, a video quality level, and an audio quality level.

Example 21 includes the subject matter of any of Examples 14-20, and wherein the network communicator is further to transmit, in response to a determination the requested application is stored local to the mobile edge computing device, at least a portion of the requested application to the endpoint device, wherein the at least a portion of the requested application is usable to initiate user interaction with the requested application.

Example 22 includes the subject matter of any of Examples 14-21, and wherein to transmit the at least the portion of the received application to the endpoint device comprises to (i) run the application on the mobile edge computing device and (ii) stream data related to the application to the endpoint device.

Example 23 includes the subject matter of any of Examples 14-22, and wherein the application acquirer is further to initiate the automated application exchange negotiation between the application provider computing device and the network operator computing device; and transmit, in response to a determination that the automated application exchange negotiation was successful, the requested application to the endpoint device.

Example 24 includes the subject matter of any of Examples 14-23, and wherein to transmit the requested application to the endpoint device includes to transmit at least one of one or more monitoring parameters and one or more upgrade offers.

Example 25 includes the subject matter of any of Examples 14-24, and wherein the one or more monitoring parameters include at least one of a bandwidth usage, a quality level, quality of service data, and telemetry data.

Example 26 includes the subject matter of any of Examples 14-25, and wherein the one or more upgrade offers include an amount of bandwidth, a video quality level, an audio quality level and a cost associated with each upgrade offer.

Example 27 includes a method for performing an automated application exchange negotiation in an operator network, the method comprising receiving, by a mobile edge computing device, an application request from an endpoint device in wireless communication with the mobile edge computing device; determining, by the mobile edge computing device, whether an application corresponding to the application request is stored at one of the mobile edge computing device or an application provider computing device forwarding, by the mobile edge computing device and in response to a determination that the application is stored at the application provider computing device, the application request to the application provider computing device; initiating, by the mobile edge computing device and subsequent to forwarding the application request and in response to a determination that a service level agreement (SLA) is not presently available for the application requested, the automated application exchange negotiation between the application provider computing device and a network operator computing device, wherein the network operator computing device controls operations performed within the operator network; receiving, by the mobile edge computing device, a result of the automated application exchange negotiation; and forwarding, by the mobile edge computing device, the result to the mobile edge computing device.

Example 28 includes the subject matter of Example 27, and wherein initiating the automated application exchange negotiation comprises transmitting one or more terms of the SLA to the application provider computing device, wherein the one or more terms of the SLA are usable to perform the automated application exchange negotiation with the network operator computing device.

Example 29 includes the subject matter of any of Examples 27 and 28, and further including receiving, by the mobile edge computing device and subsequent to the result of the automated application exchange negotiation indicating the automated application exchange negotiation was successful, the application from the application provider computing device; and transmitting, by the mobile edge computing device, at least a portion of the received application to the endpoint device.

Example 30 includes the subject matter of any of Examples 27-29, and further including performing, by the mobile edge computing device, an action as a function of the result, wherein performing the action comprises to provide an indication to the network operator computing device to one of purchase additional negotiation time, indicate that the application is no longer requested, or perform the automated application exchange negotiation on behalf of the endpoint device.

Example 31 includes the subject matter of any of Examples 27-30, and further including notifying, by the mobile edge computing device, an operator of the operator network to apply billing procedures based upon one or more terms of the SLA in response to a determination that the result indicates the automated application exchange negotiation was successful.

Example 32 includes the subject matter of any of Examples 27-31, and further including receiving, by the mobile edge computing device and subsequent to having received the result of the automated application exchange negotiation, an offer to upgrade one or more terms of the SLA; and transmitting, by the mobile edge computing device, the offer to upgrade the one or more terms of the SLA to the endpoint device.

Example 33 includes the subject matter of any of Examples 27-32, and wherein the one or more terms of the SLA include at least one of a duration of time, an amount of bandwidth, a video quality level, and an audio quality level.

Example 34 includes the subject matter of any of Examples 27-33, and further including transmitting, by the mobile edge computing device and in response to a determination the requested application is stored local to the mobile edge computing device, at least a portion of the requested application to the endpoint device, wherein the at least a portion of the requested application is usable to initiate user interaction with the requested application.

Example 35 includes the subject matter of any of Examples 27-34, and wherein transmitting the at least the portion of the received application to the endpoint device comprises (i) running the application on the mobile edge computing device and (ii) streaming data related to the application to the endpoint device.

Example 36 includes the subject matter of any of Examples 27-35, and further including initiating, by the mobile edge computing device, the automated application exchange negotiation between the application provider computing device and the network operator computing device; and transmitting, by the mobile edge computing device and in response to a determination that the automated application exchange negotiation was successful, the requested application to the endpoint device.

Example 37 includes the subject matter of any of Examples 27-36, and wherein transmitting the requested application to the endpoint device includes transmitting at least one of one or more monitoring parameters and one or more upgrade offers.

Example 38 includes the subject matter of any of Examples 27-37, and wherein transmitting the one or more monitoring parameters comprises transmitting one or more of a bandwidth usage, a quality level, quality of service data, and telemetry data.

Example 39 includes the subject matter of any of Examples 27-38, and wherein transmitting the one or more upgrade offers comprises transmitting one or more of an amount of bandwidth, a video quality level, an audio quality level and a cost associated with each upgrade offer.

Example 40 includes a mobile edge computing device comprising a processor; and a memory having stored therein a plurality of instructions that when executed by the processor cause the mobile edge computing device to perform the method of any of Examples 27-39.

Example 41 includes one or more machine readable storage media comprising a plurality of instructions stored thereon that in response to being executed result in a mobile edge computing device performing the method of any of Examples 27-39.

Example 42 includes a mobile edge computing device for performing an automated application exchange negotiation in an operator network, the mobile edge computing device comprising a network communicator to receive an application request from an endpoint device in wireless communication with the mobile edge computing device; means for determining, by the mobile edge computing device, whether an application corresponding to the application request is stored at one of the mobile edge computing device or an application provider computing device means for forwarding, by the mobile edge computing device and in response to a determination that the application is stored at the application provider computing device, the application request to the application provider computing device; and means for initiating, by the mobile edge computing device and subsequent to forwarding the application request and in response to a determination that a service level agreement (SLA) is not presently available for the application requested, the automated application exchange negotiation between the application provider computing device and a network operator computing device, wherein the network operator computing device controls operations performed within the operator network, wherein the network communicator is further to (i) receive a result of the automated application exchange negotiation and (ii) forward the result to the mobile edge computing device.

Example 43 includes the subject matter of Example 42, and wherein the means for initiating the automated application exchange negotiation comprises means for transmitting one or more terms of the SLA to the application provider computing device, wherein the one or more terms of the SLA are usable to perform the automated application exchange negotiation with the network operator computing device.

Example 44 includes the subject matter of any of Examples 42 and 43, and wherein the network communicator is further to receive, subsequent to the result of the automated application exchange negotiation indicating the automated application exchange negotiation was successful, the application from the application provider computing device; and transmit at least a portion of the received application to the endpoint device.

Example 45 includes the subject matter of any of Examples 42-44, and further including means for performing, by the mobile edge computing device, an action as a function of the result, wherein the means for performing the action comprises to provide an indication to the network operator computing device to one of purchase additional negotiation time, indicate that the application is no longer requested, or perform the automated application exchange negotiation on behalf of the endpoint device.

Example 46 includes the subject matter of any of Examples 42-45, and further including means for notifying, by the mobile edge computing device, an operator of the operator network to apply billing procedures based upon one or more terms of the SLA in response to a determination that the result indicates the automated application exchange negotiation was successful.

Example 47 includes the subject matter of any of Examples 42-46, and wherein the network communicator is further to receive, subsequent to having received the result of the automated application exchange negotiation, an offer to upgrade one or more terms of the SLA; and transmit the offer to upgrade the one or more terms of the SLA to the endpoint device.

Example 48 includes the subject matter of any of Examples 42-47, and wherein the one or more terms of the SLA include at least one of a duration of time, an amount of bandwidth, a video quality level, and an audio quality level.

Example 49 includes the subject matter of any of Examples 42-48, and wherein the network communicator is further to transmit, in response to a determination the requested application is stored local to the mobile edge computing device, at least a portion of the requested application to the endpoint device, wherein the at least a portion of the requested application is usable to initiate user interaction with the requested application.

Example 50 includes the subject matter of any of Examples 42-49, and wherein to transmit the at least the portion of the received application to the endpoint device comprises (i) running the application on the mobile edge computing device and (ii) streaming data related to the application to the endpoint device.

Example 51 includes the subject matter of any of Examples 42-50, and further including means for initiating the automated application exchange negotiation between the application provider computing device and the network operator computing device; and wherein the network communicator is further to transmit, in response to a determination that the automated application exchange negotiation was successful, the requested application to the endpoint device.

Example 52 includes the subject matter of any of Examples 42-51, and wherein to transmit the requested application to the endpoint device includes to transmit at least one of one or more monitoring parameters and one or more upgrade offers.

Example 53 includes the subject matter of any of Examples 42-52, and wherein to transmit the one or more monitoring parameters comprises to transmit one or more of a bandwidth usage, a quality level, quality of service data, and telemetry data.

Example 54 includes the subject matter of any of Examples 42-53, and wherein to transmit the one or more upgrade offers comprises to transmit one or more of an amount of bandwidth, a video quality level, an audio quality level and a cost associated with each upgrade offer.

The invention claimed is:

1. One or more non-transitory, computer-readable media comprising a plurality of instructions stored thereon that, when executed, causes a network operator computing device to:
   receive, from an application provider computing device, a user parameter-based quote for an application exchange between the application provider computing device and a mobile edge computing device for an application requested by the mobile edge computing device, wherein the quote includes information related to the application exchange;
   analyze information included in the quote to determine whether to accept the quote; and
   transmit a notification to the application provider computing device in response to a determination to accept the quote, wherein the notification authorizes the application provider computing device to provide the application to the mobile edge computing device consistent with the quote.

2. The one or more non-transitory, computer-readable media of claim 1, wherein the plurality of instructions, when executed, further cause the network operator computing device to transmit a rejection notification to the application provider computing device in response to a determination to not accept the quote, wherein the rejection notification provides an indication that the application provider computing device is not authorized to provide the application to the mobile edge computing device.

3. The one or more non-transitory, computer-readable media of claim 2, wherein the plurality of instructions, when executed, further cause the network operator computing device to:
   receive, from the application provider computing device and in response to the rejection notification, an updated quote for the application exchange between the application provider computing device and the mobile edge computing device for the application requested by the mobile edge computing device, wherein the updated quote is different from the quote; and analyze information included in the updated quote to determine whether to accept the updated quote.

4. The one or more non-transitory, computer-readable media of claim 3, wherein the plurality of instructions, when executed, further cause the network operator computing device to transmit an acceptance notification to the application provider computing device in response to a determination to accept the updated quote, wherein the acceptance notification authorizes the application provider computing device to provide the application to the mobile edge computing device consistent with the updated quote.

5. The one or more non-transitory, computer-readable media of claim 3, wherein the plurality of instructions, when executed, further cause the network operator computing device to:

determine, in response to receipt of the updated quote, whether a length of time since receipt of the quote is equal to or greater than a threshold length of time, wherein to analyze the information included in the updated quote comprises to reject the updated quote in response to a determination that the length of time is equal to or greater than the threshold length of time.

6. The one or more non-transitory, computer-readable media of claim 3, wherein the updated quote comprises an updated quote of a plurality of updated quotes received from the application provider computing device, and wherein the plurality of instructions, when executed, further cause the network operator computing device to:

determine whether the number of the plurality of updated quotes received from the application provider computing device is equal to or greater than a threshold number, wherein to analyze the information included in the updated quote comprises to reject the updated quote in response to a determination that the number of the plurality of updated quotes received from the application provider computing device is equal to or greater than a threshold number.

7. The one or more non-transitory, computer-readable media of claim 3, wherein the plurality of instructions, when executed, further cause the network operator computing device to:

determine whether a negotiation threshold has been reached, wherein the negotiation threshold defines a maximum amount of time since receipt of the quote or a maximum number of updated quotes received from the application provider computing device;

determine to reject the updated quote in response to a determination that the negotiation threshold has been reached; and transmit an offer for the application to the application provider computing device in response to a determination that the negotiation threshold has been reached, wherein the offer identifies a cost value for the authorization of the application provider computing device to provide the application to the mobile edge computing device.

8. The one or more non-transitory, computer-readable media of claim 1, wherein the quote comprises at least one of a radio quality, a mobility of an endpoint device, a resolution, a user service level agreement (SLA) with an owner of application or operator network, a usage time, an amount of time allotted for the automated application exchange negotiation, and a current negotiated price.

9. A network operator computing device for automated application exchange negotiation, the network operator computing device comprising:

network communicator circuitry to receive, from an application provider computing device, a quote for an application exchange between the application provider computing device and a mobile edge computing device for an application requested by the mobile edge computing device, wherein the quote includes information related to the application exchange; and application exchange negotiator circuitry to analyze information included in the quote to determine whether to accept the quote, wherein the network communicator circuitry is further to transmit a notification to the application provider computing device in response to a determination to accept the quote, wherein the notification authorizes the application provider computing device to provide the application to the mobile edge computing device consistent with the quote.

10. The network operator computing device of claim 9, wherein the network communicator circuitry is further to transmit a rejection notification to the application provider computing device in response to a determination to not accept the quote, wherein the rejection notification provides an indication that the application provider computing device is not authorized to provide the application to the mobile edge computing device.

11. The network operator computing device of claim 10, wherein:

the network communicator circuitry is further to receive, from the application provider computing device and in response to the rejection notification, an updated quote for the application exchange between the application provider computing device and the mobile edge computing device for the application requested by the mobile edge computing device, wherein the updated quote is different from the quote, and the application exchange negotiator circuitry is further to analyze information included in the updated quote to determine whether to accept the updated quote.

12. The network operator computing device of claim 11, wherein the network communicator circuitry is further to transmit an acceptance notification to the application provider computing device in response to a determination to accept the updated quote, wherein the acceptance notification authorizes the application provider computing device to provide the application to the mobile edge computing device consistent with the updated quote.

13. The network operator computing device of claim 11, wherein application exchange negotiator circuitry is further to determine, in response to receipt of the updated quote, whether a length of time since receipt of the quote is equal to or greater than a threshold length of time, wherein to analyze the information included in the updated quote comprises to reject the updated quote in response to a determination that the length of time is equal to or greater than the threshold length of time.

14. The network operator computing device of claim 11, wherein the updated quote comprises an updated quote of a plurality of updated quotes received from the application provider computing device, and wherein application exchange negotiator circuitry is further to determine whether the number of the plurality of updated quotes received from the application provider computing device is equal to or greater than a threshold number, wherein to analyze the information included in the updated quote comprises to reject the updated quote in response to a determination that the number of the plurality of updated quotes received from the application provider computing device is equal to or greater than a threshold number.

15. The network operator computing device of claim 11, wherein application exchange negotiator circuitry is further to:
determine whether a negotiation threshold has been reached, wherein the negotiation threshold defines a maximum amount of time since receipt of the quote or a maximum number of updated quotes received from the application provider computing device, and
determine to reject the updated quote in response to a determination that the negotiation threshold has been reached; and
wherein the network communicator circuitry is further to transmit an offer for the application to the application provider computing device in response to a determination that the negotiation threshold has been reached, wherein the offer identifies a cost value for the authorization of the application provider computing device to provide the application to the mobile edge computing device.

16. The network operator computing device of claim 9, wherein the quote comprises at least one of a radio quality, a mobility of an endpoint device, a resolution, a user service level agreement (SLA) with an owner of application or operator network, a usage time, an amount of time allotted for the automated application exchange negotiation, and a current negotiated price.

17. A method for automated application exchange negotiation, the method comprising:
receiving, by a network operator computing device and from an application provider computing device, a quote for an application exchange between the application provider computing device and a mobile edge computing device for an application requested by the mobile edge computing device, wherein the quote includes information related to the application exchange;
analyzing, by the network operator computing device, information included in the quote to determine whether to accept the quote; and
transmitting, by the network operator computing device, a notification to the application provider computing device in response to a determination to accept the quote, wherein the notification authorizes the application provider computing device to provide the application to the mobile edge computing device consistent with the quote.

18. The method of claim 17, further comprising transmitting, by the network operator computing device, a rejection notification to the application provider computing device in response to a determination to not accept the quote, wherein the rejection notification provides an indication that the application provider computing device is not authorized to provide the application to the mobile edge computing device.

19. The method of claim 18, further comprising:
receiving, by the network operator computing device and from the application provider computing device and in response to the rejection notification, an updated quote for the application exchange between the application provider computing device and the mobile edge computing device for the application requested by the mobile edge computing device, wherein the updated quote is different from the quote; and
analyzing, by the network operator computing device, information included in the updated quote to determine whether to accept the updated quote.

20. The method of claim 19, further comprising transmitting, by the network operator computing device, an acceptance notification to the application provider computing device in response to a determination to accept the updated quote, wherein the acceptance notification authorizes the application provider computing device to provide the application to the mobile edge computing device consistent with the updated quote.

21. The method of claim 19, further comprising:
determining, by the network operator computing device and in response to receipt of the updated quote, whether a length of time since receipt of the quote is equal to or greater than a threshold length of time,
wherein analyzing the information included in the updated quote comprises rejecting the updated quote in response to a determination that the length of time is equal to or greater than the threshold length of time.

22. The method of claim 19, wherein the updated quote comprises an updated quote of a plurality of updated quotes received from the application provider computing device, and further comprising:
determining, by the network operator computing device, whether the number of the plurality of updated quotes received from the application provider computing device is equal to or greater than a threshold number,
wherein analyzing the information included in the updated quote comprises rejecting the updated quote in response to a determination that the number of the plurality of updated quotes received from the application provider computing device is equal to or greater than a threshold number.

23. The method of claim 19, further comprising:
determining, by the network operator computing device, whether a negotiation threshold has been reached, wherein the negotiation threshold defines a maximum amount of time since receipt of the quote or a maximum number of updated quotes received from the application provider computing device;
rejecting, by the network operator computing device, the updated quote in response to a determination that the negotiation threshold has been reached; and
transmitting, by the network operator computing device, an offer for the application to the application provider computing device in response to a determination that the negotiation threshold has been reached, wherein the offer identifies a cost value for the authorization of the application provider computing device to provide the application to the mobile edge computing device.

24. The method of claim 17, wherein the quote comprises at least one of a radio quality, a mobility of an endpoint device, a resolution, a user service level agreement (SLA) with an owner of application or operator network, a usage time, an amount of time allotted for the automated application exchange negotiation, and a current negotiated price.

* * * * *